US012089006B1

(12) United States Patent
de Jonge et al.

(10) Patent No.: US 12,089,006 B1
(45) Date of Patent: Sep. 10, 2024

(54) EAR-WORN DEVICE CONFIGURED FOR OVER-THE-COUNTER AND PRESCRIPTION USE

(71) Applicant: Chromatic Inc., New York, NY (US)

(72) Inventors: Matthew de Jonge, Brooklyn, NY (US); Andrew J. Casper, Inver Grove Heights, MN (US); Nicholas Morris, Brooklyn, NY (US)

(73) Assignee: Chromatic Inc., New York, NY (US)

( * ) Notice: Subject to any disclaimer, the term of this patent is extended or adjusted under 35 U.S.C. 154(b) by 0 days.

(21) Appl. No.: 18/481,071

(22) Filed: Oct. 4, 2023

Related U.S. Application Data

(63) Continuation of application No. 18/349,949, filed on Jul. 10, 2023, now Pat. No. 11,849,286, which is a continuation of application No. 17/972,481, filed on Oct. 24, 2022.

(60) Provisional application No. 63/271,682, filed on Oct. 25, 2021.

(51) Int. Cl.
*H04R 25/00* (2006.01)

(52) U.S. Cl.
CPC .......... *H04R 25/554* (2013.01); *H04R 25/50* (2013.01)

(58) Field of Classification Search
CPC .............................. H04R 25/554; H04R 25/50
See application file for complete search history.

(56) References Cited

U.S. PATENT DOCUMENTS 9,881,631 B2 1/2018 Erdogan et al.
10,721,571 B2 7/2020 Crow et al.
10,812,915 B2 10/2020 Santos et al.
10,957,301 B2 3/2021 Hoby et al.
11,330,378 B1 5/2022 Jelcicová et al.
11,375,325 B2 6/2022 Froehlich et al.
(Continued)

FOREIGN PATENT DOCUMENTS

EP 0 357 212 A2 3/1990
WO WO 2022/079848 A1 4/2022
(Continued)

OTHER PUBLICATIONS

Christensen, A 'game-changer' for millions of Americans: You can now buy hearing aids over the counter. CNN health. Oct. 17, 2022. https://www.cnn.com/2022/10/17/health/over-the-counter-hearing-aids-available [last accessed Nov. 2, 2022], 5 pages.
(Continued)

*Primary Examiner* — Brian Ensey
(74) *Attorney, Agent, or Firm* — Wolf, Greenfield & Sacks, P.C.

(57) ABSTRACT

According to some embodiments, an ear-worn device, e.g., a hearing aid, is provided that operates both as an over-the-counter device, as well as a prescription device. Features stored on the ear-worn device may be used to amplify, enhance, de-noise, or otherwise process audio signals in a manner desired by the user. Some features, or settings of those features, process audio signals in a manner that is unsafe for users with mild-to-moderate hearing loss and thus are disabled when the ear-worn device is operating as an over-the-counter device. Such features and settings may be enabled after the ear-worn device is fit to the user by a licensed professional.

20 Claims, 14 Drawing Sheets

(56) References Cited

U.S. PATENT DOCUMENTS

| | | | | |
|---|---|---|---|---|
| 11,418,896 | B1 * | 8/2022 | Ching | H04R 25/505 |
| 11,523,231 | B2 * | 12/2022 | Recker | H04R 25/407 |
| 2021/0289299 | A1 | 9/2021 | Durrieu | |
| 2022/0095061 | A1 | 3/2022 | Diehl et al. | |
| 2022/0159403 | A1 | 5/2022 | Sporer et al. | |
| 2022/0223161 | A1 | 7/2022 | Fuchs et al. | |
| 2022/0230048 | A1 | 7/2022 | Li et al. | |
| 2022/0232321 | A1 | 7/2022 | Wexler et al. | |
| 2022/0232331 | A1 | 7/2022 | Jelcicová et al. | |
| 2022/0256294 | A1 | 8/2022 | Diehl et al. | |
| 2022/0408199 | A1 * | 12/2022 | Dahl | H04R 25/305 |

FOREIGN PATENT DOCUMENTS

| | | | |
|---|---|---|---|
| WO | WO 2022/107393 | A1 | 5/2022 |
| WO | WO 2022/191879 | A1 | 9/2022 |

OTHER PUBLICATIONS

Giri et al., Personalized Percepnet: Real-time, Low-complexity Target Voice Separation and Enhancement. Amazon Web Service, Jun. 8, 2021, arXiv preprint arXiv:2106.04129. 5 pages.

Hassan et al., ‘Help is on the way’: FDA finalizes rule that should usher in cheaper hearing aids. CNN health. Aug. 16, 2022. https://www.cnn.com/2022/08/16/health/fda-otc-hearing-aids?cid=external-feeds_iluminar_newsbreak [last access Nov. 2, 2022], 4 pages.

* cited by examiner

EAR-WORN DEVICE CONFIGURED FOR OVER-THE-COUNTER AND PRESCRIPTION USE

CROSS-REFERENCE TO RELATED APPLICATIONS

This application is a continuation, claiming the benefit under 35 U.S.C. § 120, of U.S. patent application Ser. No. 18/349,949, entitled "EAR-WORN DEVICE CONFIGURED FOR OVER-THE-COUNTER AND PRESCRIPTION USE," filed Jul. 10, 2023, which is hereby incorporated by reference in its entirety.

U.S. patent application Ser. No. 18/349,949 is a continuation claiming the benefit under 35 U.S.C. § 120 of U.S. patent application Ser. No. 17/972,481, entitled "EARN-WORN DEVICE CONFIGURED FOR OVER-THE-COUNTER AND PRESCRIPTION USE," filed Oct. 24, 2022, which is hereby incorporated by reference in its entirety.

U.S. patent application Ser. No. 17/972,481 claims the benefit under 35 U.S.C. § 119(e), of U.S. Provisional patent Application Ser. No. 63/271,682, entitled "METHOD, APPARATUS AND SYSTEM FOR HEARING AID WITH REMOTE UNLOCK FEATURES," filed on Oct. 25, 2021, which is hereby incorporated by reference herein in its entirety.

BACKGROUND

The present applicant relates to ear-worn devices, such as hearing aids. Hearing aids are used to help those who have trouble hearing to hear better. Typically, hearing aids are configured by a licensed professional to address the hearing needs of a wearer.

BRIEF SUMMARY

According to some embodiments, a method of controlling an output of an ear-worn device is provided. The ear-worn device stores a plurality of features thereon. A first feature of the plurality of features is used to generate an output of the ear-worn device. The method includes: using at least one processor to perform: transmitting a first command to the ear-worn device, wherein the first command is configured to cause the ear-worn device to adjust the first feature to a first setting included in a first range of settings; after transmitting the first command, receiving input indicative of permission to adjust the first feature to a second setting different from the first setting and included in a second range of settings different from the first range of settings; and after receiving the input, transmitting, to the ear-worn device, a second command, wherein the second command is configured to cause the ear-worn device to adjust the first feature to the second setting.

According to some embodiments, a method of generating an output of an ear-worn device is provided. The ear-worn device has a plurality of features stored thereon. The plurality of features includes a first feature configured to generate the output of the ear-worn device. The method includes: using at least one processor to perform: generating a first output of the ear-worn device according to a first setting of the first feature, wherein the first setting is included in a first range of settings; after generating the first output of the ear-worn device, receiving input indicative of permission to adjust the first feature to a second setting different from the first settings and included in a second range of settings different from the first range of settings; adjusting the first feature to the second setting only after receiving the input; and generating a second output of the ear-worn device according to the second setting of the first feature.

According to some embodiments, an ear-worn device is provided. The ear-worn device includes: at least one processor; and at least one non-transitory computer-readable storage medium storing processor-executable instructions that, when executed by the at least one processor to perform: generating a first output of the ear-worn device according to a first setting of the first feature, wherein the first setting is included in a first range of settings; after generating the first output of the ear-worn device, receiving input indicative of permission to adjust the first feature to a second setting different from the first setting and included in a second range of settings different from the first range of settings; adjusting the first feature to the second setting only after receiving the input; and generating a second output of the ear-worn device according to the second setting of the first feature.

According to some embodiments, a method for determining whether to recommend a professional fitting of an ear-worn device is provided. The ear-worn device stores a plurality of features thereon. A first feature of the plurality of features is used to generate an output of the ear-worn device. The method includes: using at least one processor to perform: transmitting, to the ear-worn device, a command configured to cause the ear-worn device to generate an output according to a first setting of the first feature; receiving user input indicative of how a quality of the output compares to a quality threshold; determining, based on the user input, whether to recommend the professional fitting of the ear-worn device; and after determining to recommend the professional fitting, outputting a recommendation to obtain the professional fitting of the ear-worn device.

According to some embodiments, a method for determining whether to recommend a professional fitting of an ear-worn device is provided. The ear-worn device stores a plurality of features thereon. A first feature of the plurality of features is used to generate an output of the ear-worn device. The method includes: using at least one processor to perform: receiving a request from a user to adjust the first feature to a first setting included in a first range of settings; determining, based on the first setting, whether to recommend the professional fitting of the ear-worn device; and after determining to recommend the professional fitting, outputting a recommendation to obtain the professional fitting of the ear-worn device.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
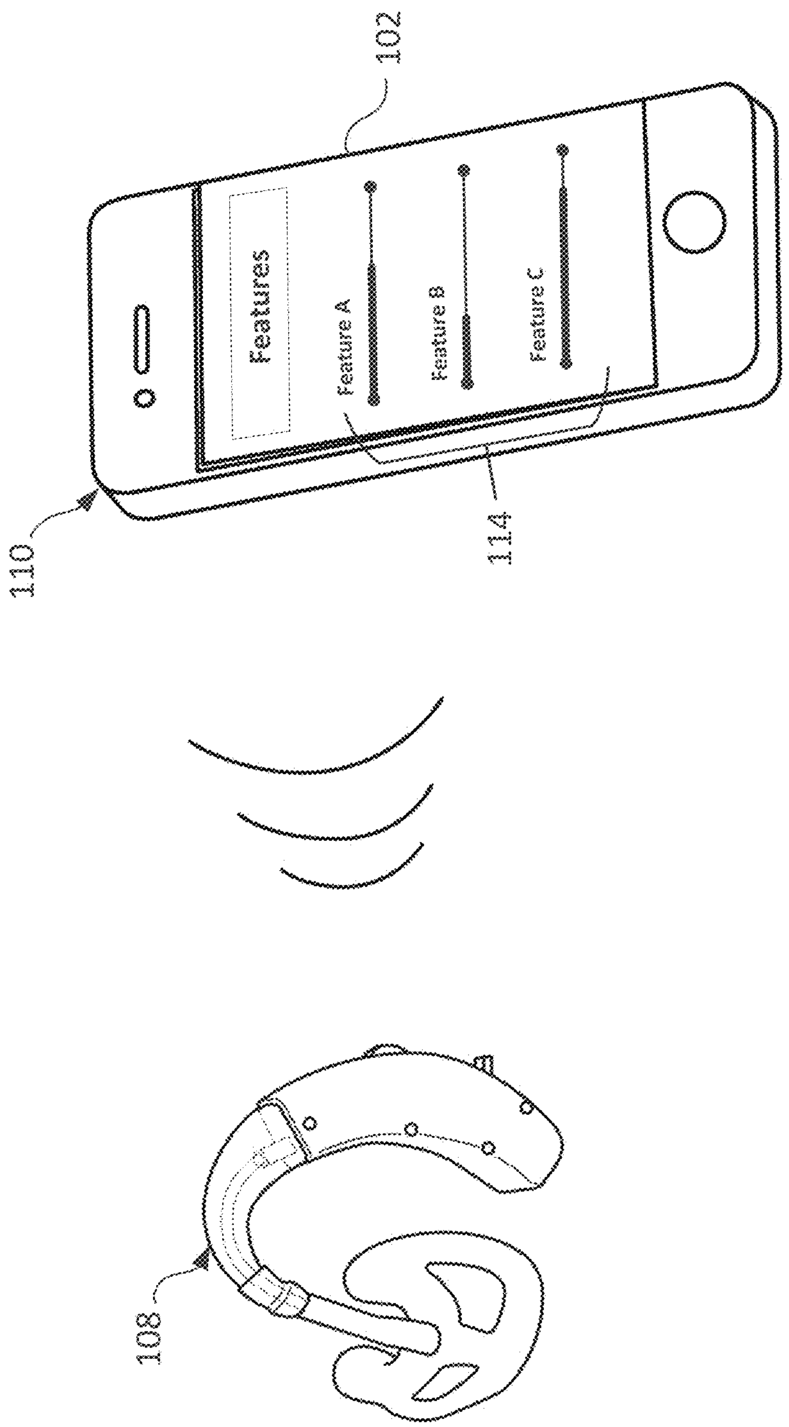
FIG. 1 illustrates communication between an ear-worn device and a separate electronic device, according to a non-limiting embodiment of the present application.

According to an aspect of the technology described herein, an ear-worn device, which is a hearing aid in at least some embodiments, is provided that operates both as an over-the-counter device, as well as a prescription device. Features stored on the ear-worn device are used to amplify, enhance, de-noise, or otherwise process audio signals in a manner desired by the user. Some features, or settings of those features, process audio signals in a manner that is unsafe for users with mild-to-moderate hearing loss and thus are disabled when the ear-worn device is operating as an over-the-counter device. Such features and settings may be enabled after the ear-worn device is fit to the user by a licensed professional.

The U.S. Food and Drug Administration (FDA) has established a distinction between "prescription" hearing aids and "over-the-counter" hearing aids. Prescription hearing aids are those that have been programmed by a licensed professional to meet the specific needs of the user. The licensed professional will adjust the features of the hearing aid to address the degree and type of hearing loss experienced by the user.

While prescription hearing aids are tailored specifically to a patient's individual hearing needs, they are burdensome to obtain and subsequently maintain. The patient will typically initially consult a licensed professional, such as a licensed physician, a medical professional, or an audiologist, who will perform a hearing assessment and program the hearing aid. Furthermore, it is common that the patient's hearing will change over time, requiring periodic follow-up appointments to reprogram the hearing aid to meet the adapting needs of the patient. Not only is this a time-consuming process, but it also incurs expenses related to visits with the licensed professional and the cost of the hearing aid itself. To many individuals, especially those with only mild or moderate hearing loss, the burden and cost of obtaining a prescription device outweigh the benefit of improved hearing. Accordingly, these individuals may be deterred from obtaining such a device.

Over-the-counter (OTC) hearing aids are expected to improve accessibility of hearing aids. Namely, they are pre-programmed devices that can be purchased over the counter and used without consulting a licensed professional. Accordingly, individuals who are unlikely to obtain a prescription device due to the above-described burdens, or whose hearing loss is sufficiently mild such that prescription settings are not needed, may be more inclined to purchase and use an over-the-counter device to address their hearing needs.

However, hearing aids providing simply the functionality permitted for over-the-counter hearing aids exhibit certain limitations. While the user may be able to adjust some features of the hearing aid, this adjustment is limited by FDA regulations, which are intended to prevent device output that is distorted, or which could be harmful to users with only mild or moderate hearing loss. With a limited number of features and a limited range in which those features can be adjusted, the over-the-counter device cannot be tailored to address the specific needs of some users in the way that prescription devices can. Accordingly, an over-the-counter hearing aid may not meet the needs of users with more severe hearing loss. Furthermore, even if a user does not have severe hearing loss, they may struggle with selecting features and settings to sufficiently address their hearing needs. Furthermore, OTC hearing aids will be purchased based on a user's self-perceived mild-to-moderate hearing loss, which may not align with the level of hearing loss that would be measured by a hearing professional. As a result, users may purchase OTC hearing aids even when the devices may not be clinically appropriate for their hearing loss.

The inventors have recognized that it may be challenging for prospective users to assess whether an over-the-counter hearing aid will be sufficient to address their hearing needs, or whether they need a prescription device. For example, users with moderate hearing loss may experience improved hearing with an over-the-counter device, but they would experience a much more substantial improvement with a prescription device. As another example, a user for whom an over-the-counter device was initially sufficient may fail to recognize that their hearing has declined and that they need a prescription device. Furthermore, without prompting, users who already own an over-the-counter device may be reluctant to spend extra time and money to purchase a new prescription device with which they are unfamiliar.

Aspects of the present application provide hearing aids or other ear-worn devices that can be configured as both an over-the-counter device and as a prescription device. The ear-worn device stores features that can be adjusted (e.g., by a wearer or by a licensed professional) to different settings. In some embodiments, a feature refers to a feature of an audio output signal generated by the ear-worn device. The ear-worn device may be configured to generate an output signal according to a feature and its respective setting.

Example Features

Nonlimiting examples of features include amplitude (e.g., volume), gain applied to one or more frequency bands, target signal-to-noise ratio, uncomfortable loudness level, number of channels, number of frequency bands, attack and release times, compression ratio, wind noise cancellation, feedback cancellation, noise cancellation, ear tip-dependent filters, number and composition of available presets, and directivity. However, it should be appreciated that the features may include any other suitable feature, as aspects of the technology described herein are not limited in this respect.

In some embodiments, volume refers to the sound pressure level measured in decibels. According to the techniques described herein, the ear-worn device may generate an output audio signal having a particular volume (e.g., a setting of the volume feature). Generating the output may involve processing an input audio signal. For example, the ear-worn device may modify (e.g., increase or decrease) the amplitude of the input audio signal to and output the modified signal.

In some embodiments, the ear worn device may divide the incoming sound into different channels and/or bands corresponding to different frequency ranges. In some embodiments, signals in different channels may be processed separately from one another. In some embodiments, different frequency bands can have different gains applied to them, colloquially referred to as changing the "volume". Accordingly, a user may be able to independently adjust the gain of each frequency band. For example, the user may increase the volume of low frequency signals components but decrease the volume of high frequency components. To generate the output signal, the ear-worn device may separately adjust the volume of each frequency band according to the selected volume settings. The ear-worn device may recombine the signals to generate the audio that is then output to the user.

In some embodiments, the ear worn device may apply different signal processing depending on the hardware configuration. For example, receiver-in-canal behind-the-ear hearing aids typically have a small silicone tip on the receiver. This tip can either be "open" where there are vents in the tip, or "closed". Because the different tips adjust how the receiver produces sound (for example, closed tips can enable more low frequency sound than open tips), the hearing aid may apply different filters to the signal to optimize the playback for the tip being used in the hearing aid.

In some embodiments, a user may be restricted from adjusting the volume above a maximum volume or below a minimum volume. The maximum and minimum volumes may be adjusted (e.g., as a result of a professional fitting) to address the hearing needs of a user. Prior to a professional fitting, the maximum and minimum volume may be set to comply with FDA regulations for over-the-counter devices.

In some embodiments, gain refers to the ratio between the amplitude of an audio input and the amplitude of an audio output signal. According to the techniques described herein, the ear-worn device may generate an output audio signal according to a particular gain (e.g., a setting of the gain feature). Generating the output may involve amplifying an audio input signal by the particular gain.

In some embodiments, different gains can be applied to different frequency bands. Accordingly, a user may be able to independently adjust the gain applied to each frequency band. As a non-limiting example, a higher gain may be applied to low frequency signal components, than the gain applied to high frequency signal components. Accordingly, low frequency signal components may be amplified to a greater degree than high frequency signal components. The ear-worn device may recombine the signals to generate the audio that is output to the user.

In some embodiments, the gain applied to a frequency band may change as a function of input volume. Accordingly, the ear-worn device may apply more gain to quiet sounds than to louder sounds such that more of the input signal can be heard without exceeding the uncomfortable loudness levels of the user. This has the effect of compressing a wide dynamic range into the user's dynamic range, which is typically reduced by hearing loss. Accordingly, when a user adjusts the "volume" of a certain frequency band, the device will adjust the gains applied to that frequency band and may do so in a non-linear way so as to prevent the output from exceeding Uncomfortable Loudness Levels or levels that are unsafe for the user.

In some embodiments, a user may be restricted from adjusting the gain above a maximum gain or below a minimum gain. In some embodiments, the maximum and minimum gains are set to prevent the output of the ear-worn device from violating maximum and minimum output limits. For example, the maximum and minimum output limits may be defined by FDA regulations for over-the-counter devices. Additionally, or alternatively, in some embodiments, the maximum and minimum gains are set to prevent the output from being distorted in the over-the-counter configuration of the ear-worn device. The maximum and minimum gains may be adjusted (e.g., as a result of a professional fitting) to address the hearing needs of a user.

Additionally, or alternatively, in some embodiments, there may be restrictions on the relative gains applied to different frequency bands. In other words, the user may be restricted to adjusting the gains, such that the difference between the gains does not exceed a threshold difference. For example, if a first gain is applied to a first frequency band, then the user may apply, to a second frequency band, a second gain, so long as the difference between the first and the second gain does not exceed the threshold difference.

In some embodiments, the ear-worn-device generates an output according to a target SNR. According to the techniques described herein, the ear-worn device may generate an output audio signal having the target SNR or an SNR within a threshold value of the target SNR. Generating the output may involve processing an input audio signal. For example, depending on the noise level in the input audio signal, the ear-worn device may process the input audio signal to reduce the noise to attain the target SNR.

In some embodiments, a user may be restricted from adjusting the target SNR above a maximum or below a minimum target SNR. For example, the maximum SNR may be restricted to avoid distortion of the output signal, may depend on the limits of the ear-worn device, and/or may depend on the environment in which the ear-worn device is positioned.

In some embodiments, one or more (e.g., a plurality) of the features described above can be used to generate an output of an ear-worn device. As a nonlimiting example, the output of the ear-worn device may be generated according to a particular volume and/or according to a target SNR.

In some embodiments, one or more (e.g., a plurality) of the features used to generate the output of the ear-worn device may be adjusted according to the techniques described herein. As a nonlimiting example, the volume may be adjusted to a particular volume and/or the target SNR may be adjusted to a particular target SNR.

It should be appreciated that the features described can apply to any embodiments in the application, as aspects of the technology described herein are not limited in this respect.

Example Configurations

In some embodiments, the ear-worn device is obtained as an over-the-counter device. In some embodiments, the over-the-counter configuration stores "pre-sets," which represent a combination of pre-selected settings (or values) for two or more features. Different pre-sets may differ in the pre-selected values for the features, in the features that make up the pre-sets, or both. For example, a preset in some embodiments includes preset values of gain, compressional ratio, and attack and release times. However, it should be appreciated that the presets can include combinations of any two or more features, such as any two or more of the features listed in the "Example Features" section, as aspects of the technology described herein are not limited in this respect.

In some embodiments, the features and settings may be pre-selected based on historical use data. For example, the pre-selected features and settings may include those that are most often used or those that are used, on average, by other wearers. Additionally, or alternatively, the features and settings may be pre-selected to comply with FDA regulations. In some embodiments, the ear-worn device may be configured to generate output based on the pre-sets. The output may be generated with or without further input from the wearer.

In some embodiments, the wearer may perform a self-fit of the over-the-counter device. For example, performing a self-fit may include selecting and/or adjusting features such that the ear-worn device meets the needs of the wearer, as perceived by the wearer. The wearer-selected and/or adjusted features may be in addition to, or alternative to any provided over-the-counter presets. For example, the wearer may perform a self-fit by adjusting features to settings within the permitted ranges, as described herein in more detail. In some embodiments, unpermitted features and/or settings may be referred to as "locked" features.

In some embodiments, the over-the-counter ear-worn device can be re-configured as a result of a professional fitting. For example, the licensed professional may select and adjust features that may have been accessible and/or inaccessible to the wearer in the over-the-counter configuration. The licensed professional may also impose additional or alternative restrictions on the features and settings, making certain features and/or settings inaccessible to the wearer following the professional fitting. As a nonlimiting example, in an over-the-counter configuration, the wearer may be able to adjust a feature within an initial range of settings. The range may be dictated by FDA regulations, for example. After a professional fitting, the wearer may be able to adjust the feature within an updated range of settings. In some embodiments, the updated range of settings may be deemed to be "unlocked" by the professional fitting. The updated range of settings may include none, some, or all of the settings that were previously-available for selection and adjustment by the wearer. Additionally, or alternatively, some or all of the settings included in the updated range of settings may have previously-unavailable for adjustment by the wearer.

In some embodiments, the features and settings that are accessible to the wearer in the over-the-counter configuration are sufficient for the wearer. For example, the wearer may have only mild hearing loss, and thus the over-the-counter output limits are sufficient. However, the wearer may want a licensed professional or a customer service representative to select the features and settings to specifically fit the wearer's hearing needs. Accordingly, the wearer may consult a licensed professional or customer service representative, who may select and adjust features from among those that are already accessible to the wearer. The licensed professional or customer service representative may not permit the wearer to select and adjust any additional or alternative features which were not already available to the wearer in the over-the-counter configuration. Similarly, the licensed professional may not impose any additional or alternative restrictions on the features and settings. Rather, the licensed professional may help the wearer to fit the ear-worn device within the restraints of the over-the-counter configuration. In some embodiments, the user can request a consultation to fit the device or customize the device via an application on the electronic device, and the consultation may happen via phone or video chat.

In some embodiments, when an over-the-counter device is reconfigured through a professional fitting. The reconfigured device may have different hardware requirements. As a nonlimiting example, one type of receiver may be suitable for ear-worn devices with lower output limits. However, if that ear-worn device is reconfigured to have higher output limits (e.g., as a result of the professional fitting), that type of receiver may no longer be sufficient. Accordingly, after a professional fitting, the receiver may be replaced with a different type of receiver. As another example, the receiver includes an open tip or a closed tip that is place in the ear canal. The open tip may be suitable for, and provide improved performance for, lower output limits. However, if the ear-worn device is reconfigured to have higher output limits (e.g., as a result of a professional fitting), the open tip may cause feedback and therefore provide unsatisfactory performance. The closed tip, in some embodiments, prevents feedback and thus may provide better performance in some operating scenarios. Accordingly, after a professional fitting, the receiver tip may be replaced with a closed tip. In some embodiments, there may be different over-the-counter configurations of the ear-worn device. For example, the configurations may differ depending on a degree of self-perceived hearing loss. A first configuration may restrict adjustment of features within a range of settings that particularly address the needs of wearers having a first degree of hearing loss, while a second configuration may restrict adjustment of features within a different range of settings that particularly address the needs of wearers having a second degree of hearing loss. For example, the first configuration may allow for higher output levels as compared to the second configuration. Accordingly, the first configuration may be suitable for individuals with a higher degree of self-perceived hearing loss. Prospective wearers may purchase or obtain the ear-worn device configuration that best suits their needs.

It should be appreciated that the configurations described can apply to any embodiments in the application, as aspects of the technology described herein are not limited in this respect.

When configured as an over-the counter device, in some embodiments, only a subset of the stored features may be used to generate the output of the ear-worn device, and the adjustment of those features may be limited to particular settings. For example, a user may adjust a feature within a limited range of settings, such that output generated according to that feature does not exceed an output limit, which, in some embodiments, may be defined by FDA regulations. For example, the user may adjust the volume to a maximum volume accessible to the user. Such a volume may be less than the device is capable of. The maximum volume may be selected such that output generated according to the maximum volume does not exceed the output limits. For example, in order to meet requirements for an over-the-counter device, the wearer may be prevented from increasing the volume above a certain threshold (e.g., 115 dB SPL, 120 dB SPL, etc.). However, this may render the device unacceptable for someone with more severe hearing loss.

According to an aspect of the technology described herein, the user of the ear-worn device can consult a licensed professional to use and adjust other features and settings of the ear-worn device, which may not be accessible in the over-the-counter mode of operation. Such a consultation may be conducted remotely or in person. For example, the licensed professional can remotely program the ear-worn device based on results of a hearing test or the patient's medical records. The user may then be able to access and adjust additional or alternative features and settings of the ear-worn device beyond those that were available in the over-the-counter mode of operation, and which are particularly suited for the hearing needs of the user.

Aspects of the present application further provide techniques for recommending to a user when to seek a consultation with a licensed professional to obtain a professional fitting of their ear-worn device. As described herein, such a determination may be made based on user feedback and/or based on the features and settings selected by the wearer in configuring the ear-worn device.

FIG. 1 illustrates an audio system including an ear-worn device 108 and a separate electronic device 110. In this example, the ear-worn device is a hearing aid and the electronic device 110 is a smartphone.

In some embodiments, the ear-worn device 108 detects sound and outputs an audio signal to the ear-worn device wearer. For example, the ear-worn device wearer may be hard of hearing, and the ear-worn device 108 may be a hearing aid. The ear-worn device 108 may process the detected sound according to one or more features, which may be adjusted to particular setting(s). For example, the ear-worn device may process the detected sound to generate an output having a particular volume. In some embodiments, at least some of the feature(s) and setting(s) may be selected by a user, such as the wearer of the ear-worn device and/or a licensed professional. For example, the user may adjust the feature(s) and setting(s) according to preferences of the wearer of the ear-worn device. Additionally, or alternatively, the user may adjust the feature(s) and setting(s) according to the type and degree of hearing loss of the wearer of the ear-worn device. In some embodiments, at least some of the feature(s) and setting(s) may be pre-stored on the ear-worn device, such that the ear-worn device is configured to process the detected sound and generate an audio signal without user input.

The ear-worn device 108 and the electronic device 110 may work in combination to generate the audio signal to be output to the wearer of the ear-worn device. For example, the electronic device 110 may store features and settings available for adjustment by the ear-worn device wearer. When the ear-worn device wearer wants to adjust the output of the ear-worn device, the wearer may select the particular feature and/or setting using the electronic device 110. The electronic device 110 may command the ear-worn device 108 to generate the audio output signal according to the selected feature(s) and setting(s). Additionally, or alternatively, the electronic device 110 may receive input from a user other than the ear-worn device wearer indicating features and settings that the ear-worn device should use to generate the audio output signal. For example, a licensed professional may select the feature(s) and setting(s) using a remote device, which is in communication with the electronic device 110. The electronic device 110 may then command the ear-worn device 108 to generate the audio output signal according to the selected feature(s) and setting(s).

The electronic device 110 includes a display screen 102 which display features 114 of the ear-worn device 108. The ear-worn device wearer can adjust settings of the features 114 by interacting with the display screen 102. The ear-worn device 108 may use the selected settings of the features 114 to process audio signals detected from the microphone(s) of the ear-worn device to generate an audio output. The generated output may be output to the ear-worn device wearer through the speaker device(s) (e.g., receiver(s)) of the ear-worn device 108.

Figure 2:
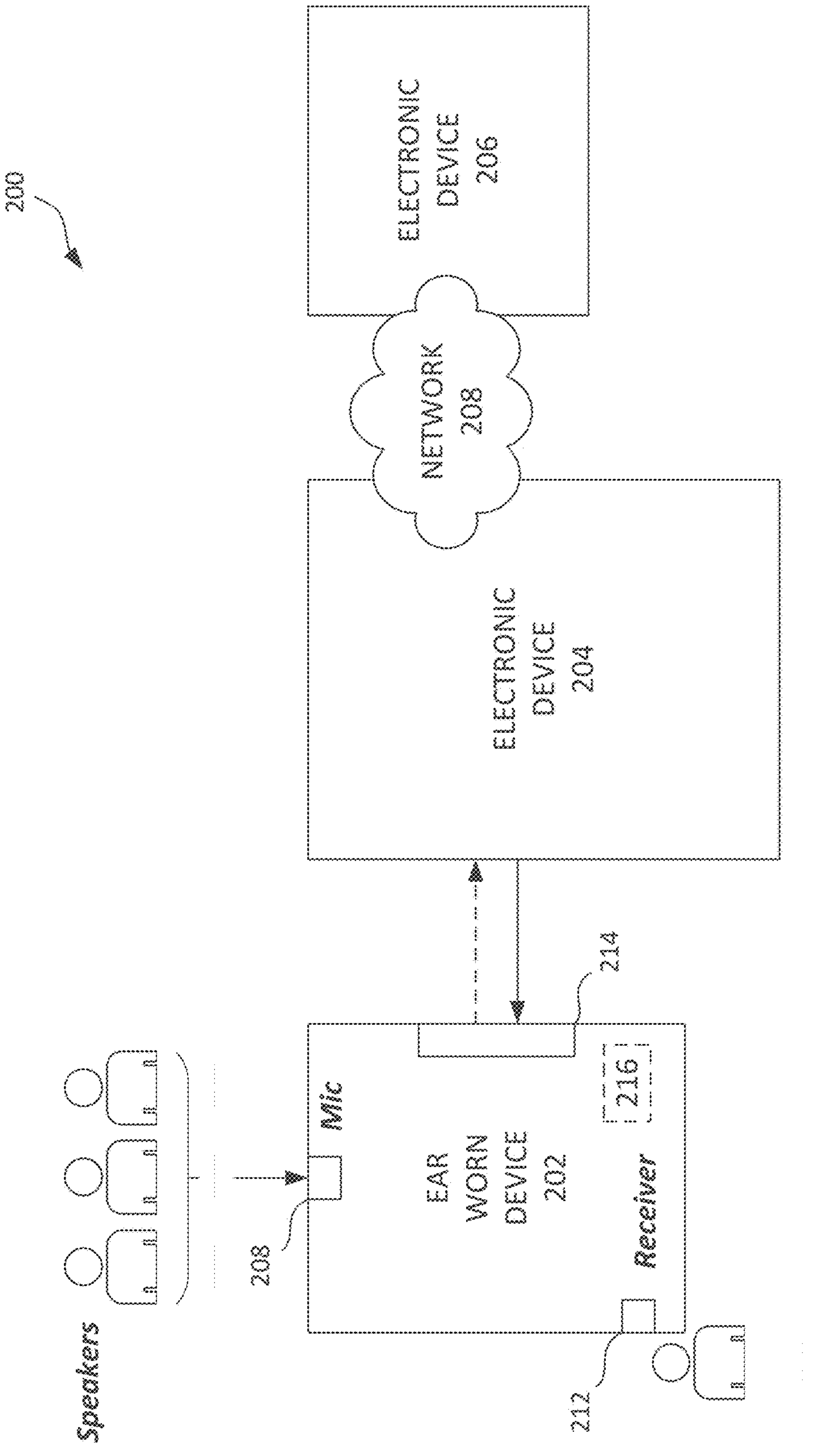
FIG. 2 illustrates a system with an ear-worn device and a portable electronic device for controlling an output of an ear-worn device, according to a non-limiting embodiment of the present application.

FIG. 2 illustrates a system with an ear-worn device and a portable electronic device for controlling an output of an ear-worn device, according to a non-limiting embodiment of the present application. Audio system 200 may be an example implementation of the system shown in FIG. 1. For example, audio system 200 may include an ear-worn device 202 and electronic device 204. The ear-worn device 202 may be an example implementation of the ear-worn device 108 of FIG. 1. Ear-worn device 202 as described in FIG. 2 may have various forms. For example, the ear-worn device may be a hearing aid or a headphone, or any suitable audio device. Additionally, ear-worn device 202 may include a communication port 214 configured to communicate (e.g., wired or wirelessly) with an external device and exchange data with an external device, such as electronic device 204. Electronic device 204 may be an example implementation of the electronic device 110 of FIG. 1. For example, electronic device 204 may be a smart phone, or any suitable portable electronic device associated with the wearer of the ear-worn device.

In some non-limiting examples, ear-worn device 202 may include a microphone 208 and a speaker device (e.g., a receiver) 212. Microphone 208 may be configured to detect audio signal from sound (e.g., speech). For example, the audio signal may include speech components from one or more speakers. Ear-worn device 202 may be capable of processing the audio signal detected by the microphone 208 to generate an audio signal according to preferences and/or hearing needs of the wearer. In some embodiments, ear-worn device 202 is configured to process the detected audio signal according to one or more features stored on the ear-worn device 202. A feature may be set to a particular setting.

In some embodiments, a feature refers to a feature of an audio output signal. Nonlimiting examples include volume, gain applied to one or more frequency bands, target signal-to-noise ratio, and maximum comfortable output levels. Processing a detected audio signal according to a feature may involve processing the detected signal to generate an audio signal having the feature at the selected feature setting. For example, the detected signal may be processed to generate an output audio signal having a particular volume. As described herein, one or more components of the ear-worn device 202, such as a controller, neural network engine, and digital signal processor, for example, may be configured to process the detected signal to generate the output. Examples of features and settings are described herein including at least with respect to the section "Example Features."

In some embodiments, ear-worn device 202 stores the features and feature settings locally, such as in a memory 216 containing the features and their respective settings. In some embodiments, ear-worn device 202 may receive commands from an external device, such as electronic device 204. For example, the ear-worn device 202 may be configured to communicate wirelessly with electronic device 204.

In some embodiments, electronic device 204 is configured to transmit commands to the ear-worn device 202 to select or apply features (e.g., from the features stored on the ear-worn device) to be used to generate the audio output signal. As an example, the stored features may include gain applied to a particular frequency band. A command transmitted to the ear-worn device 202 by the electronic device 204 may cause the ear-worn device to generate an output signal by applying a particular gain to the particular frequency band.

In some embodiments, electronic device 204 is configured to transmit commands to the ear-worn device 202 to adjust the setting of a particular feature. As an example, the ear-worn device 202 may generate an output signal having an initial amplitude. A command transmitted to the ear-worn device 202 by the electronic device 204 may cause the ear-worn device to generate an output signal having a different amplitude than the initial amplitude.

In some embodiments, the electronic device 204 is configured to transmit commands to the ear-worn device 202 in response to receiving input from a user. When the user is the wearer of the ear-worn device, user input may be received through a user interface of the electronic device 204. For example, the ear-worn device wearer may interact with a GUI to select a feature and/or a setting of a feature. When the user is not the wearer of the ear-worn device, such as a licensed professional, the user input may be received from an external device, such as electronic device 206. For example, the user may interact with a user interface of electronic device 206 to select a feature and/or a setting of a feature. The electronic device 206 may then transmit the user input to electronic device 204 via network 208. Additionally, or alternatively, in some embodiments, when the electronic device 206 is in the same location as the ear-worn device 202, ear-worn device 202 may be configured to connect directly to electronic device 206 via any suitable wireless protocol, such as Bluetooth, for example.

In some embodiments, electronic device 204 is not separate from the ear-worn device 202. For example, a user interface on the ear-worn device 202 may be configured to allow a user to control one or more features of the ear-worn device. For example, the user interface may include one or more buttons configured to allow the wearer to adjust the volume of the ear-worn device. Such a configuration may be in addition to or in lieu of a user interface on a separate electronic device (e.g., electronic device 204). For example, an applet or application ("app") running on the wearer's software may be configured to allow a user to control one or more features of the ear-worn device.

Electronic device 206 may include one or more electronic devices. When electronic device 206 includes more than one device, the devices may be located together in a same facility (e.g., the same medical facility, home, research facility, etc.) or the devices may be distributed among multiple, different locations (e.g., multiple medical facilities, homes, research facilities, etc.). The relative location of the electronic device 206 with respect to the electronic device 204 and ear-worn device 202 may vary. For example, a wearer of the ear-worn device may bring the ear-worn device 202 and electronic device 204 to a medical facility where electronic device 206 is located. Additionally, or alternatively, the electronic device 206 may stay in the medical facility but be used to remotely communicate with electronic device 204 to control ear-worn device 202, while the electronic device 204 and ear-worn device are located in another location, such as the wearer's home.

In some embodiments, the ear-worn device 202 is configured to generate output signals according to pre-selected and/or wearer-selected features and settings until the wearer obtains a professional fitting of the ear-worn device. During a professional fitting, a licensed professional may test the wearer's hearing through the ear-worn device 202, and/or through a separate technology using the electronic device 204, electronic device 208, and/or any other suitable equipment. For example, the licensed professional may cause different tones to play through the ear-worn device 202 as part of the hearing test. In some embodiments, the licensed professional may select features and settings based on results of the hearing test. For example, the licensed professional may select the features and settings by interacting with electronic device 206. In some embodiments, the licensed professional may also provide input restricting certain features and settings. For example, the licensed professional may restrict the wearer from being able to select and/or adjust the restricted features.

Electronic device 204 may be further configured to determine whether to recommend that a wearer of the ear-worn device obtain a professional fitting of the ear-worn device 202. In some embodiments, such a determination may be based on input from the ear-worn device wearer. For example, the ear-worn device wearer may provide input through a user interface of electronic device 204 indicating the quality of the output of the ear-worn device 202. If the input indicates that the quality is insufficient, then the electronic device 204 may recommend a professional fitting. Additionally, or alternatively, in some embodiments, the electronic device 204 may determine whether to recommend a professional fitting based on the feature settings selected by the wearer. For example, if the wearer has adjusted one or more features to the maximum or minimum available setting, the electronic device 204 may recommend a professional fitting. Example techniques for determining whether to recommend a professional fitting are further described herein including at least with respect to FIG. 8.

Figure 3A:
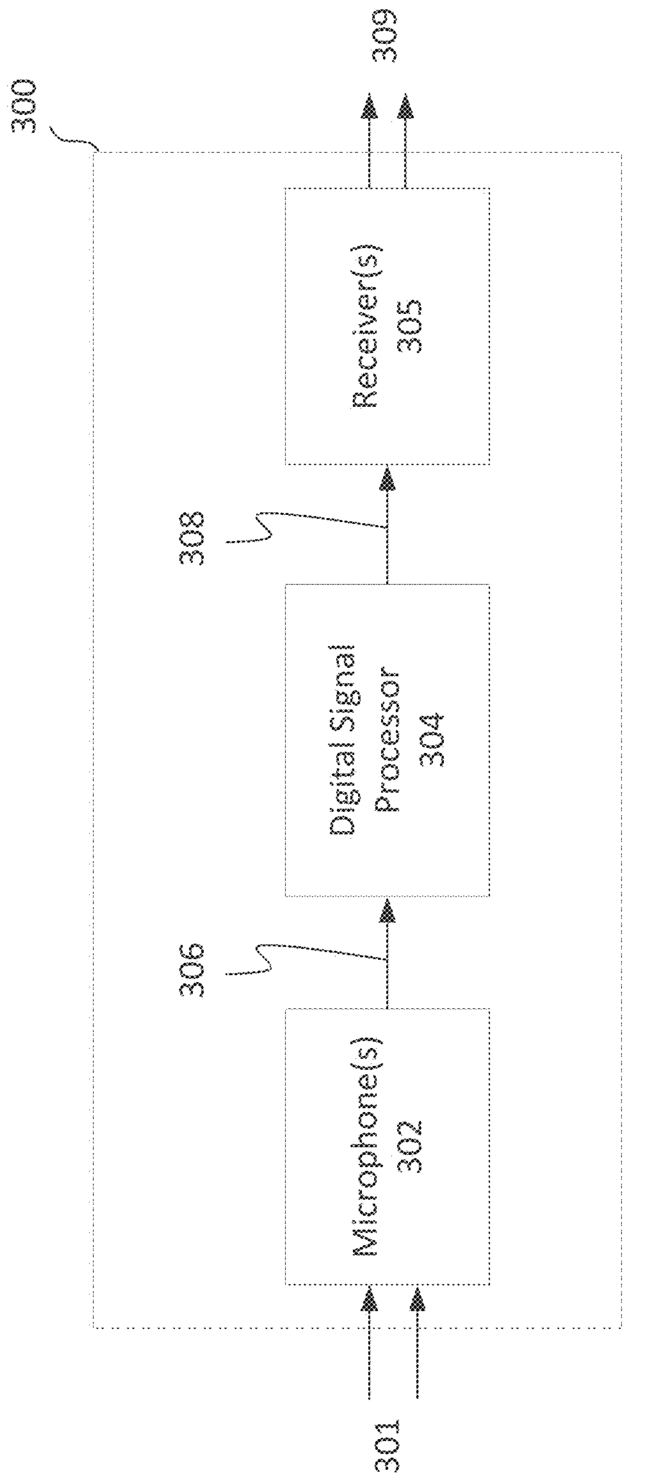
FIG. 3A illustrates example components of an ear-worn device that may be configured to enhance speech, according to a non-limiting embodiment of the present application.

FIG. 3A illustrates example components of an ear-worn device that may be configured to enhance speech, according to a non-limiting embodiment of the present application. In some embodiments, ear-worn device 300 may be an implementation of at least a portion of the ear-worn device 108 of FIG. 1 and 202 of FIG. 2. Ear-worn device 300 may include one or more microphones 302, and one or more receivers 305. In some embodiments, microphone(s) 302 may be configured to detect audio signal. The audio signal may be generated by the microphone(s) from sound 301, e.g., speech in a conversation. In a multi-speaker conversation, the audio signal detected by the microphone(s) may include speech components attributable to multiple speakers. In some embodiments, the audio signal detected by the microphone(s) may be analog signal. The ear-worn device 300 may additionally include an analog-to-digital converter (ADC, not shown) to convert the analog signal to digital signal 306 as input to the digital signal processor 304. In some embodiments, the microphone(s) 302 may be capable of producing digital audio signals. In such case, the audio signal detected by the microphone(s) may be digital signal 306, which can be directly provided to the digital signal processor 304.

With further reference to FIG. 3A, receiver(s) 305 may be configured to output the digital audio signal 306 for playback to the wearer of the ear-worn device. For example, the receiver(s) 305 may receive the digital signal 306 from the microphone(s) 302 and convert the digital signal 306 to analog signal before producing the output signal 309. In other examples, the ear-worn device may additionally include a digital-to-analog converter (DAC, not shown) to convert the digital signal 306 to analog signal as input to the receiver(s) 305 for providing the output signal 309.

In some embodiments, ear-worn device 300 may include a digital signal processor (DSP, 304) coupled between the microphone(s) 302 and the receiver(s) 305. The DSP 304 may be configured to process the digital signal and generate an enhanced output 308. For example, DSP 304 may include a frequency-based amplification.

Figure 3B:
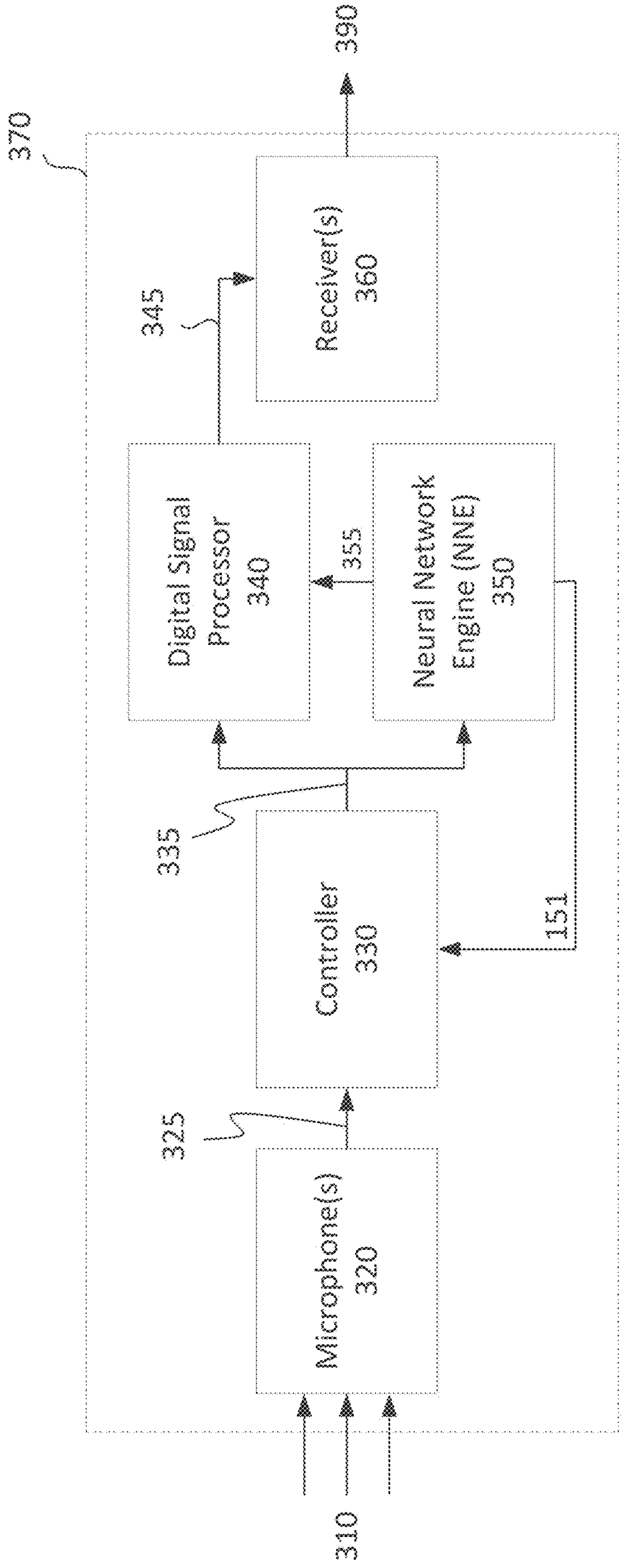
FIG. 3B illustrates example components of a variation of the ear-worn device in FIG. 3A that may be configured to enhance speech, according to a non-limiting embodiment of the present application.

FIG. 3B illustrates example components of a variation of the ear-worn device in FIG. 3A, according to a non-limiting embodiment of the present application. In some embodiments, ear-worn device 370 may be an example implementation of at least a portion of the ear-worn device 108 of FIG. 1 and 202 of FIG. 2. Ear-worn device 370 may have microphone(s) 320 and receiver(s) 360. In some embodiments, microphone(s) 320 are examples of microphone(s) 302 in FIG. 3A, and receiver(s) 360 are examples of receiver(s) 305 in FIG. 3A. Ear-worn device 370 may also include digital signal processor (DSP, 340), which, in some embodiments, is an example of DSP 304 in FIG. 3A. Additionally, ear-worn device 370 may include controller 330 configured to control both the neural network engine (NNE, 350) and DSP 340.

Controller 330 receives digital audio signal 325. Controller 330 may comprise one or more processor circuitries (herein, processors), memory circuitries and other electronic and software components configured to, among others, (a) perform digital signal processing manipulations necessary to prepare the signal for processing by the NNE 350 or the DSP 340, and (b) to determine the next step in the processing chain from among several options. In one embodiment of the disclosure, controller 330 executes a decision logic to determine whether to advance signal processing through one or both of DSP 340 and NNE 350. For example, DSP 340 may be activated at all times, whereas controller 330 executes decision logic to determine whether to activate the NNE 350 or bypass the NNE by deactivating the NNE 350.

In some embodiments, DSP 340 may be configured to apply a set of filters to the incoming audio components. Each filter may isolate incoming signals in a desired frequency range and apply a non-linear, time-varying gain to each filtered signal. The gain value may be set to achieve dynamic range compression or may identify stationary background noise. DSP 340 may then recombine the filtered and gained signals to provide an output signal 345.

As stated, in one embodiment, the controller performs digital signal processing operations to prepare the signal for processing by one or both of DSP 340 and NNE 350. NNE 350 and DSP 340 may accept as input the signal in the time-frequency domain (e.g., signal 325), so that controller 330 may take a Short-Time Fourier Transform (STFT) of the incoming signal before passing it onto either NNE 350 or DSP 340. In another example, controller 330 may perform beamforming of signals received at different microphones to enhance the audio signals coming from certain directions.

In certain embodiments, controller 330 continually determines the next step in the signal chain for processing the received audio data. For example, controller 330 activates NNE 350 based on one or more of user-controlled criteria, user-agnostic criteria, user clinical criteria, accelerometer data, location information, stored data and the computed metrics characterizing the acoustic environment, such as SNR. For example, in response to a determination that the speech is continual, or that the SNR of the input audio signal is above a threshold ratio, controller 330 may activate the NNE 350. Otherwise, controller 330 may deactivate the NNE 350, leaving the DSP 340 activated. This results in a power saving of the ear-worn device when the voice isolation network is not needed. If NNE 350 is not activated, controller 330 instead passes signal 335 directly to DSP 340. In some embodiments, controller 330 may pass data to both NNE 350 and DSP 340 simultaneously as indicated by arrows from controller 330 to DSP 340 and to NNE 350.

In some embodiments, user-controlled criteria may represent one or more logics (e.g., hardware- or software-implemented). In some examples, user-controlled criteria may comprise user inputs including the selection of an operating mode through an application on a user's smartphone or input on the ear-worn device (for example by the wearer of the ear-worn device tapping the device). For example, when a user is at a restaurant, she may change the operating mode to noise cancellation/speech isolation by making an appropriate selection on her smartphone. Additionally, and/or alternatively, user-controlled criteria may comprise a set of user-defined settings and preferences which may be either input by the user through an applet or an application (app) or learned by the device over time. For example, user-controlled criteria may comprise a user's preferences around what sounds the wearer of the ear-worn device hears (e.g., new parents may want to always amplify a baby's cry, or a dog owner may want to always amplify barking) or the user's general tolerance for background noise. Additionally, and/or alternatively, user clinical criteria may comprise a clinically relevant hearing profile, including, for example, the user's general degree of hearing loss and the user's ability to comprehend speech in the presence of noise.

User-controlled logic may also be used in connection with or aside from user-agnostic criteria (or logic). User-agnostic logic may consider variables that are independent of the user. For example, the user-agnostic logic may consider the hearing aid's available power level, the time of day or the expected duration of the NNE operation (as a function of the anticipated NNE execution demands).

In some embodiments, acceleration data as captured on sensors in the device may be used by controller 330 in determining whether to direct signal controller output signal 335 to one or both of DSP 340 and NNE 350. Movement or acceleration information may be used by controller 330 to determine whether the user is in motion or sedentary. Acceleration data may be used in conjunction with other information or may be overwritten by other data. Similarly, data from sensors capturing acceleration may be provided to the NNE as information for inference.

In other embodiments, the user's location may be used by controller 330 to determine whether to engage one or both of DSP 340 and NNE 350. Certain locations may require activation of NNE 350. For example, if the user's location indicates high ambient noise (e.g., the user is strolling through a park or is attending a concert) and no direct conversation, controller 330 may activate DSP 340 only and deactivate NNE 350. On the other hand, if the user's location suggests that the user is traveling (e.g., via car or train) and other indicators suggest human communication, then controller 330 may activate NNE 350 to enhance the audio signal by amplifying human voices over the surrounding noise.

In some embodiments, controller 330 may execute an algorithmic logic to select a processing path. For example, controller 330 may detect SNR of input audio signal 325 and determine whether one or both of DSP 340 and NNE 350 should be engaged. In one implementation, controller 330 compares the detected SNR value with a threshold value and determines which processing path to initiate. The threshold value may be one or more of empirically determined, user-agnostic or user-controlled. Controller 330 may also consider other user preferences and parameters in determining the threshold value as discussed above.

In another embodiment, controller 330 may compute certain metrics to characterize the incoming audio as input for determining a subsequent processing path. These metrics may be computed based on the received audio signal. For example, controller 330 may detect periods of silence, knowing that silence does not require the NNE to enhance, and it should therefore deactivate the NNE. In another example, controller 330 may include a Voice Activity Detector (VAD) to determine the processing path in a speech-isolation mode. In some embodiments, the VAD may be a compact (e.g., much less computationally intensive) neural network in the controller.

In an exemplary embodiment, controller 330 may receive the output of NNE 350 for recently processed audio, as indicated by arrow from NNE 350 to controller 330, as input to controller 330. NNE 350, which may be configured to isolate target audio in the presence of background noise, provides the inputs necessary to robustly estimate the SNR. Controller 330 may in turn use the output of the NNE 350 to detect when the SNR of the incoming signal is high enough or too low to influence the processing path. In still another example, the output of NNE 350 may be used to improve the robustness of VAD. Voice detection in the presence of noise is computationally intensive. By leveraging the output of NNE 350, ear-worn device 370 can implement this task with minimal computation overhead when the noise is suppressed based on isolated speech from the NNE.

When controller 330 utilizes NNE output 355, it can only utilize the output to influence the signal path for subsequently received audio signal. When a given sample of audio signal is received at the controller, the output of NNE 350 for that sample will be computed with a delay, where the output of the NNE, if computed before the next sample arrives, will influence the controller decision for the next sample. When the time interval of the sample is small enough, e.g., a few milliseconds or less than a second, such delay will not be noticeable by the wearer.

When NNE 350 is activated, using the output 355 of the NNE 350 in the controller does not incur any additional computational cost. In certain embodiments, controller 330 may engage NNE 350 for supportive computation even in a mode when NNE 350 is not the selected signal path. In such a mode, incoming audio signal is passed directly from controller 330 to DSP 340 but data (i.e., audio clips) is additionally passed at less frequent intervals to NNE 350 for computation. This computation may provide an estimate of the SNR of the surrounding environment or detect speech in the presence of noise in substantially real time.

NNE 350 may comprise one or more actual and virtual circuitries to receive controller output signal 335 and provide enhanced digital signal 355. In an exemplary embodiment, NNE 350 enhances the signal by using a neural network algorithm (NN model) to generate a set of intermediate signals. Each intermediate signal is a representative of one or more of the original sound sources that constitute the original signal. For example, incoming signal 310 may comprise of two speakers, an alarm and other background noise. In some embodiments, the NN model executed on NNE 350 may generate a first intermediate signal representing the speech and a second first intermediate signal representing the background noise. NNE 350 may also isolate one of the speakers from the other speaker. NNE 350 may isolate the alarm from the remaining background noise to ensure that the user hears the alarm even when the noise-canceling mode is activated. Different situations may require different intermediate signals and different embodiments may contain different neural networks with different capabilities best suited to the wearer's needs. In certain embodiments, a remote (off-chip) NNE may augment the capability of the local (on-chip) NNE. Examples of neural network engines are described in U.S. patent application Ser. No. 17/576,718, which is incorporated by reference herein in its entirety.

With reference to FIGS. 3A and 3B, ear-worn devices 300 and 370 may each include a single ear-piece having a microphone. In other examples, ear-worn devices 300 and 370 may each be binaural and include two ear-pieces, each ear-piece having a respective microphone. Similarly, ear-worn devices 300 and 370 may each include one or more receivers respectively included in one or two ear-pieces.

Figure 4:
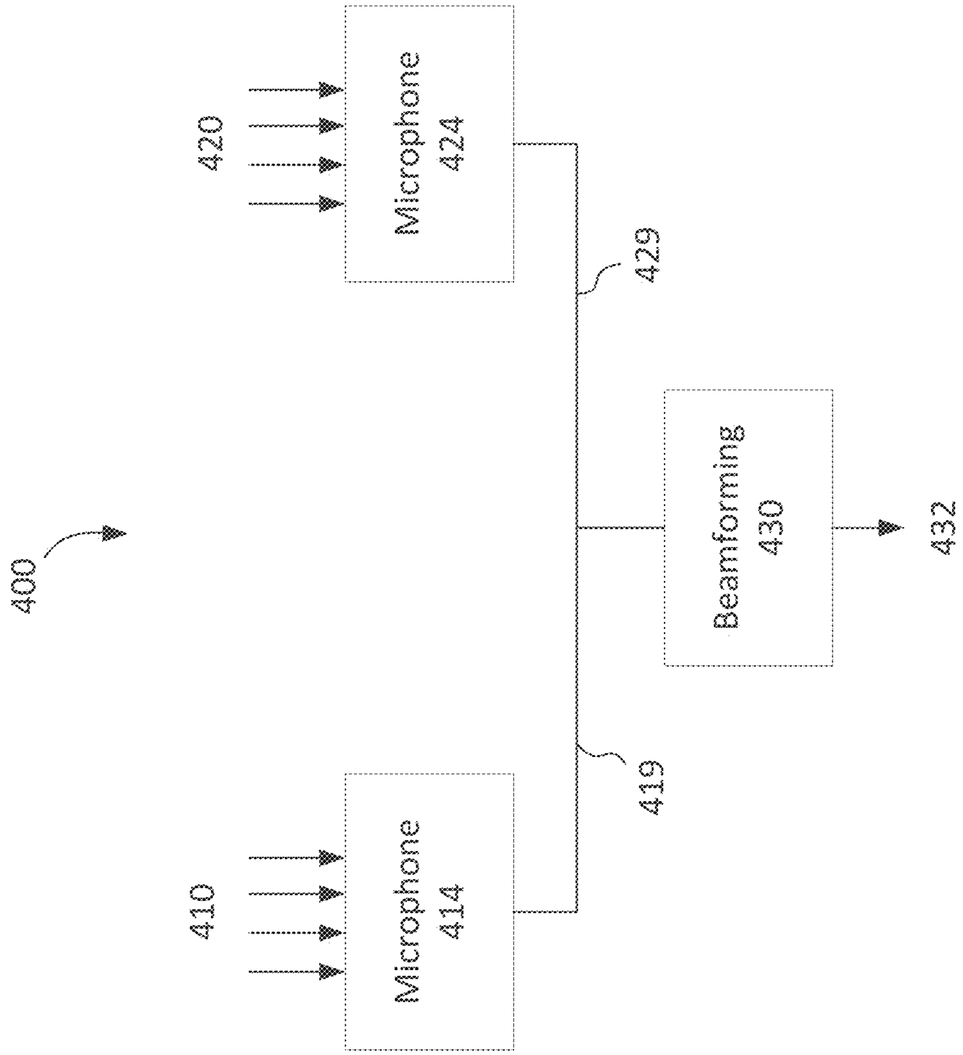
FIG. 4 illustrates example components of an ear-worn device having two microphones, according to a non-limiting embodiment of the present application.

FIG. 4 illustrates example components of an ear-worn device having two microphones, according to a non-limiting embodiment of the present application. FIG. 4 includes a portion of a circuitry 400 in an example ear-worn device. In some embodiments, the portion of circuitry 400 may be implemented in ear-worn device 108 (in FIG. 1), 202 (in FIG. 2), 300 (in FIG. 3A) and 370 (in FIG. 3B), where the ear-worn device is binaural.

In FIG. 4, circuitry 400 may include a beamformer 430 configured to process audio signal 419, 429 respectively detected from microphones 414 and 424. In some embodiments, both microphones 414, 424 reside in one ear-piece of the ear-worn device. In some embodiments, the microphones 414, 424 respectively reside in one of two ear-pieces of the ear-worn device. For example, microphone 414 may reside in a left ear-piece, while microphone 424 may reside in a right ear-piece. It should be appreciated, however, that the ear-worn device may include one or more additional microphones residing on one or both ear-pieces, as aspects of the technology described herein are not limited in this respect.

In some embodiments, beamformer 430 may be implemented in controller 330 of FIG. 3B. Beamformer 430 may generate an enhanced audio signal 432 that accounts for sounds from different directions as detected by microphones 414 and 424. As described above, the audio signals 419, 429 respectively detected by the microphones 414 and 424 may be digital signals. The output from the beamformer 430 may be digital signal as well. The enhanced audio signal 432 may be provided to a neural network engine (NNE) and/or a digital signal processor (DSP) in the ear worn device. In some embodiments, the NNE and DSP are examples of NNE 350 and DSP 340 described with respect to FIG. 3B. The output of the NNE and/or DSP may be provided to the receivers of two ear-pieces.

In some embodiments, each ear-piece may be configured to communicate with the other ear-piece and exchange audio signal with the other ear-piece. For example, beamformer 430 may be residing in a first ear-piece of an ear-worn device. The audio signal detected by the microphone of the other ear-piece may be transferred from the other ear-piece to the ear-piece in which the beamformer 430 is residing. The output of the NNE, or the output of the DSP (e.g., 304 in FIG. 3A, 340 in FIG. 3B) may be transferred back to the other ear-piece. It is appreciated that the two ear-pieces may be configured to communicate using any suitable protocol, such as near-field magnetic induction (NFMI) protocol, which allows for fast data exchange over short distances. Further, beamformer 430 may be optional, where a binaural audio stream may be detected from microphones 414 and 424 and provided to the NNE and/or DSP without using a beamformer.

In some embodiments, an ear-worn device, such as 108 (in FIG. 1), 202 (in FIG. 2), 300 (in FIG. 3A), and 370 (in FIG. 3B), can be obtained and used by a wearer without intervention by a licensed professional. Rather, the ear-worn device may be an over-the-counter device, which may be fit to the wearer by the wearer. The ear-worn device may store one or more features which can be adjusted by the wearer to generate an audio output that is desirable to the wearer. For example, the wearer may interact with an app on their smartphone to adjust the features to different settings. However, unlimited ability to adjust features may lead to distorted audio output or output levels that are harmful to wearers with mild to moderate hearing loss. Furthermore, the FDA regulates the output limits permitted on over-the-counter ear-worn device. Accordingly, the wearer may be restricted from adjusting particular features and/or adjusting a feature to particular settings.

However, this may be insufficient for some wearers. For example, wearers with moderate to severe hearing loss may require higher output limits to address their hearing needs, and the permitted features and settings may be insufficient to generate such an output. Additionally, or alternatively, while the permissible features and settings may be sufficient for a wearer, the wearer may be unable to identify the features and settings that will generate an output that is satisfactory to them.

Accordingly, in some embodiments, such wearers may consult a licensed professional who will fit the ear-worn device to the wearer, also referred to herein as a "professional fitting." The professional fitting may be performed remotely or in person. For example, the wearer and licensed professional may meet in person or on a virtual call. Additionally, or alternatively, the licensed professional may perform the professional fitting based on patient records, such as results of a hearing test.

In some embodiments, the licensed professional performs a professional fitting by selecting and/or adjusting the settings of one or more features. For example, the selections and adjustments may be made using a user interface of an electronic device, such as 206 in FIG. 2. In some cases, the licensed professional selects features and/or settings that were previously unavailable for selection or adjustment by the wearer. For example, the licensed professional may select features and settings that can be used to generate an output having an output limit that is impermissible in an over-the-counter device. In other cases, the licensed professional selects features and/or settings which were previously available for selection or adjustment by the user.

As a result of the professional fitting, the wearable device may be configured to generate an output that is specific to the hearing needs of the wearer. Accordingly, the techniques may include preventing the wearer from "undoing" the professional fitting by selecting features and settings that generate less desirable output. For example, while the wearer may still be able to select some features and/or settings, the licensed professional may restrict other features and/or settings. For example, in a self-fitting device, a user may be able to adjust the gains applied to one frequency channel without affecting the gains applied to the other frequency channels, in effect altering the frequency shaping (the relative gains across frequencies) of the device. A professional fitting will determine the ideal relative amplification between frequency bands, so after a professional fitting, the device may only allow a user to adjust a "global volume" so that gain changes do not change the frequency shaping.

Figure 5:
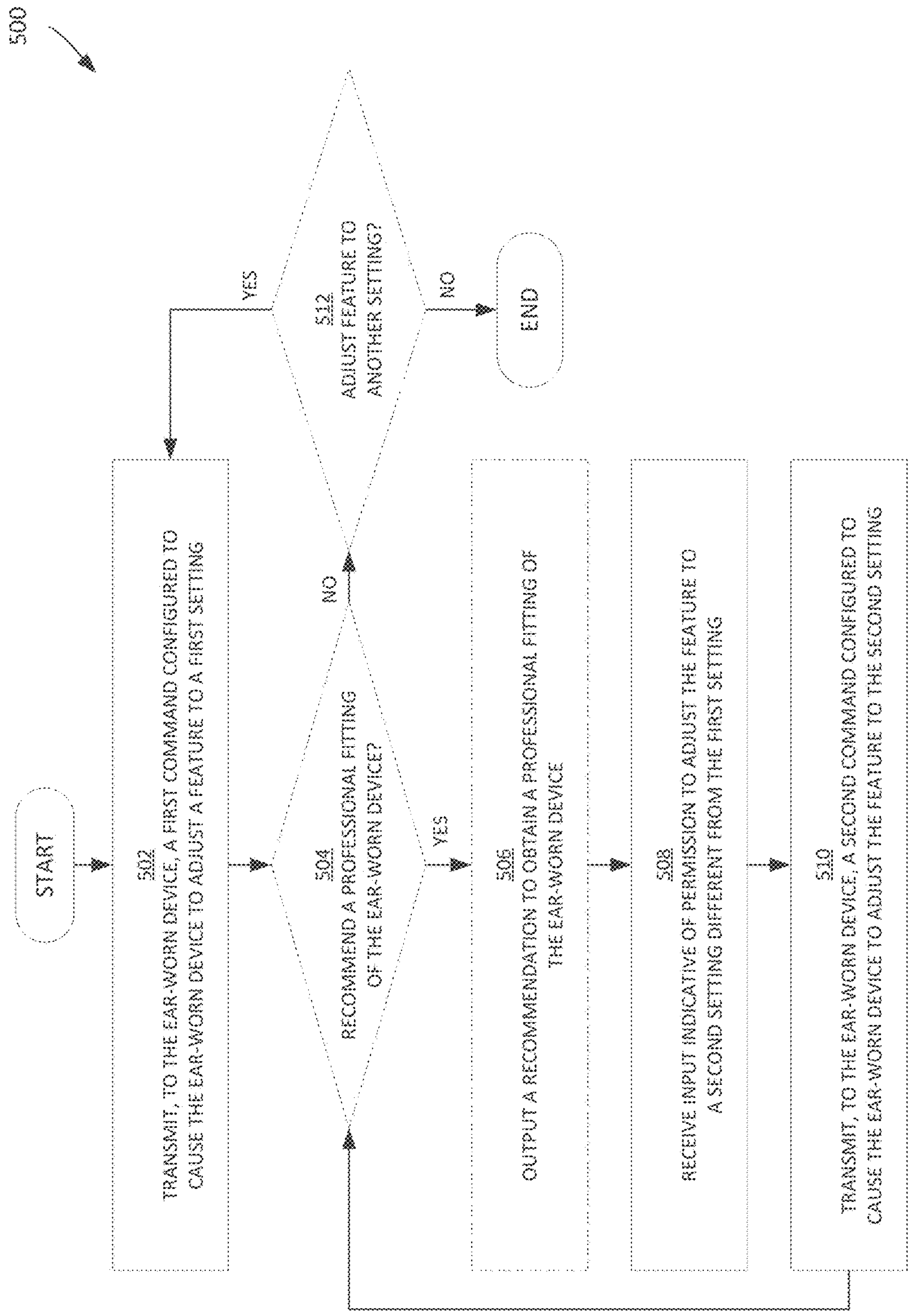
FIG. 5 is a flowchart of an example method of controlling an output of an ear-worn device having a plurality of features stored thereon, according to a non-limiting embodiment of the present application.

FIG. 5 is a flowchart of an example method 500 of controlling an output of an ear-worn device having a plurality of features stored thereon, according to a non-limiting embodiment of the present application. In some embodiments, method 500 may be implemented by a processor on an electronic device such as 204 in FIG. 2. Method 500 may implement any of the operations in various embodiments described above.

As described herein, in some embodiments, an ear-worn device may store one or more features that are used to generate an audio output signal. A feature may be adjustable to one or more settings. For example, volume is a feature that may be adjusted to different levels. Additional examples of features are described herein including at least with respect to the section "Example Features."

In some embodiments, adjusting a feature includes adjusting the feature with respect to an existing firmware image on the ear-worn device. For example, the processor of an electronic device (e.g., 204 in FIG. 2) may pass a setting to the ear-worn device, and the ear-worn device may update the existing firmware to reflect the updated setting. Additionally, or alternatively, in some embodiments, adjusting the feature includes updating the ear-worn device with a new firmware image. For example, the processor of an electronic device (e.g., 204 in FIG. 2) may push a new firmware image to the ear-worn device, which may have one or more features/and or settings different from those of the previous firmware image. This may be an efficient option when selecting and/or adjusting many features and/or settings. For example, this may be an efficient option when significantly altering the frequency amplification pipeline (e.g., increasing the number of frequency channels from 3 to 20).

At act 502, the processor transmits a first command to an ear-worn device, such as 108 (in FIG. 1), 202 (in FIG. 2), 300 (in FIG. 3A), and 370 (in FIG. 3B). In some embodiments, the first command is configured to cause the ear-worn device to adjust the feature to a first setting. For example, upon receiving the first command, the ear-worn device may store (e.g., in memory) the first setting in connection with the feature. Once the feature has been adjusted to the first setting, the ear-worn device may generate audio output signals according to the first setting of the feature. Continuing with the volume example, the first command may be configured to cause the ear-worn device to adjust the volume to a first volume. Once the volume has been adjusted, the ear-worn device may begin to generate audio output having the first volume.

In some embodiments, the processor is configured to transmit the first command to the ear-worn device in response to receiving user input. For example, a user may identify the feature to be adjusted and the first setting to which the feature should be adjusted. In some embodiments, the user input is provided by a wearer of the device. For example, the wearer may interact with an applet or application ("app") on the wearer's smartphone to provide the user input. Additionally, or alternatively, in some embodiments, the user input is provided by a secondary user such as a licensed professional, healthcare provider, or any other suitable user, as aspects of the technology are not limited in this respect. For example, the secondary user may interact with an electronic device which may transmit the first command to the ear-worn device. Additionally, or alternatively, the electronic device may communicate the user input to the wearer's electronic device, which may then transmit the first command to the ear-worn device.

In some embodiments, act 502 precedes all professional fittings of the ear-worn device. For example, the ear-worn device may be configured as an over-the-counter ear-worn device. Accordingly, the wearer of the ear-worn device may be restricted from adjusting the feature to a setting outside of a range of one or more permissible settings. In some embodiments, if the first setting is included in the range of permissible settings, then the wearer is able to provide input that would prompt the adjustment of the feature to the first setting. If the first setting is not included in the range of permissible settings, then the user is not able to provide such input. Instead, a secondary user such as a licensed professional may be able to provide the input prompting the adjustment.

In some embodiments, act 502 follows an initial professional fitting of the ear-worn device but precedes a later professional fitting. The wearer may obtain a later professional fitting if their hearing needs change, for example. After the initial professional fitting, the wearer may be restricted from adjusting the feature to a setting outside of a range of one or more settings initially designated by the licensed professional. In some embodiments, if the first setting is included in the range of designated settings, then the wearer is able to provide input that would prompt the adjustment of the feature to the first setting. If the first setting is not included in the range of designated settings, then the user is not able to provide such input. Instead, a secondary user such as a licensed professional may be able to provide the input prompting the adjustment.

At (optional) act 504, after transmitting the first command to the ear-worn device, the processor determines whether to recommend that the user obtain a professional fitting of the ear-worn device. In some embodiments, such a determination may be based on input from the ear-worn device wearer. For example, the ear-worn device wearer may provide input through a user interface of an electronic device indicating the quality of the output of the ear-worn device. If the user input indicates that the quality is insufficient, then the processor may recommend a professional fitting. Additionally, or alternatively, in some embodiments, the processor may determine whether to recommend a professional fitting based on the feature settings selected by the wearer. For example, if the wearer has adjusted one or more features to the maximum or minimum available setting, the processor may recommend a professional fitting. Example techniques for determining whether to recommend a professional fitting are further described herein including at least with respect to FIG. 8.

If, at act 504, the processor determines not to recommend a professional fitting, then method 500 proceeds to act 512, where the processor determines whether to adjust the feature to another setting.

In some embodiments, determining whether to adjust the feature to another setting includes determining whether user input has been received requesting such an adjustment. As described with respect to act 502, user input may be received from a wearer of the ear-worn device and/or from any other suitable user such as a licensed professional. If the processor determines that the feature is to be adjusted to another setting, then the method 500 returns to act 502, where the processor transmits another command to the ear-worn device configured to cause the ear-worn device to adjust the feature to the indicated setting. If the processor determines that the feature is not to be adjusted again, then method 500 ends.

If, at act 504, the processor determines to recommend a professional fitting, then method 500 proceeds to (optional) act 506. At act 506, the processor outputs a recommendation to obtain a professional fitting of the ear-worn device. In some embodiment, the recommendation is output using any suitable techniques, as aspects of the technology described herein are not limited in this respect. As an example, the processor may generate a graphical user interface (GUI) to be displayed on the wearer's electronic device. The GUI may include a message, or another suitable indication used to convey the recommendation to the wearer. In some embodiments, the wearer may interact with the GUI to schedule and/or virtually conduct an appointment to obtain the professional fitting.

At act 508, the processor receives input indicative of permission to adjust the feature to a second setting that is different from the first setting. In some embodiments, the input is received from an electronic device associated with a user other than the wearer. For example, the input may be received from an electronic device (e.g., 206 in FIG. 2) associated with a licensed professional.

In some embodiments, the input is received after a professional fitting of the ear-worn device. For example, the input may be received from an electronic device associated with a licensed professional who conducted the professional fitting. In some embodiments, the input indicates that the second setting is suitable for the wearer of the ear worn device. The second setting may have been included in the range of settings available to the user prior to the professional fitting. In other words, the licensed professional may have selected the second setting for the wearer of the ear-worn device, even if the wearer could have adjusted the feature to the second setting on their own (e.g., without permission). Alternatively, in some embodiments, the wearer may have been previously restricted from adjusting the feature to the second setting. Accordingly, the input received from the licensed professional may constitute permission to adjust the feature to the second setting.

In some embodiments, the input further indicates a restriction on the selection and adjustment of features. Since the professional fitting identifies the features and settings that address the specific hearing needs of the ear-worn device wearer, the input may indicate restrictions that prevent the wearer from "undoing" the professional fitting. For example, the input may restrict adjustment of the feature to a range of settings including the second setting. In some embodiments, the range of settings includes at least some of the settings that were available to the wearer prior to the professional fitting. Additionally, or alternatively, the range of settings includes at least some settings that were previously unavailable to the wearer prior to the professional fitting. In some embodiments, the range of settings available prior to the professional fit is wider than the range of settings available after the adjustment. In other words, the ear-worn device wearer may have had access to more settings prior to the professional fitting than afterwards. However, it should be appreciated that aspects of the technology described herein are not limited in this respect.

At act 510, the processor transmits, to the ear-worn device, a second command configured to cause the ear-worn device to adjust the feature to the second setting. In some embodiments, the second setting is different from the first setting. In some embodiments, transmitting the second command at act 510 is performed in the same or a similar manner as transmitting the first command at act 502.

In some embodiments, the processor transmits the second command in response to receiving the input indicative of the permission to adjust the feature to the second setting. For example, the input indicative of the permission may include a command to adjust the feature to the second setting.

In some embodiments, the processor transmits the second command in response to receiving user input. For example, the input received at act 508 may indicate the range of settings, including the second setting, to which the feature can be adjusted by the wearer. The wearer may subsequently provide user input requesting that the feature be adjusted to the second setting. For example, the ear-worn device wearer may interact with an app on the wearer's smartphone to provide the user input selecting the second setting.

In some embodiments, after act 510, method 500 returns to act 504, where the processor determines whether to recommend another professional fitting of the ear-worn device. As described herein, subsequent professional fittings may be obtained to address the evolving hearing needs of the ear-worn device wearer.

Though not shown, should be appreciated that method 500 may include one or more additional or alternative acts.

Figure 6:
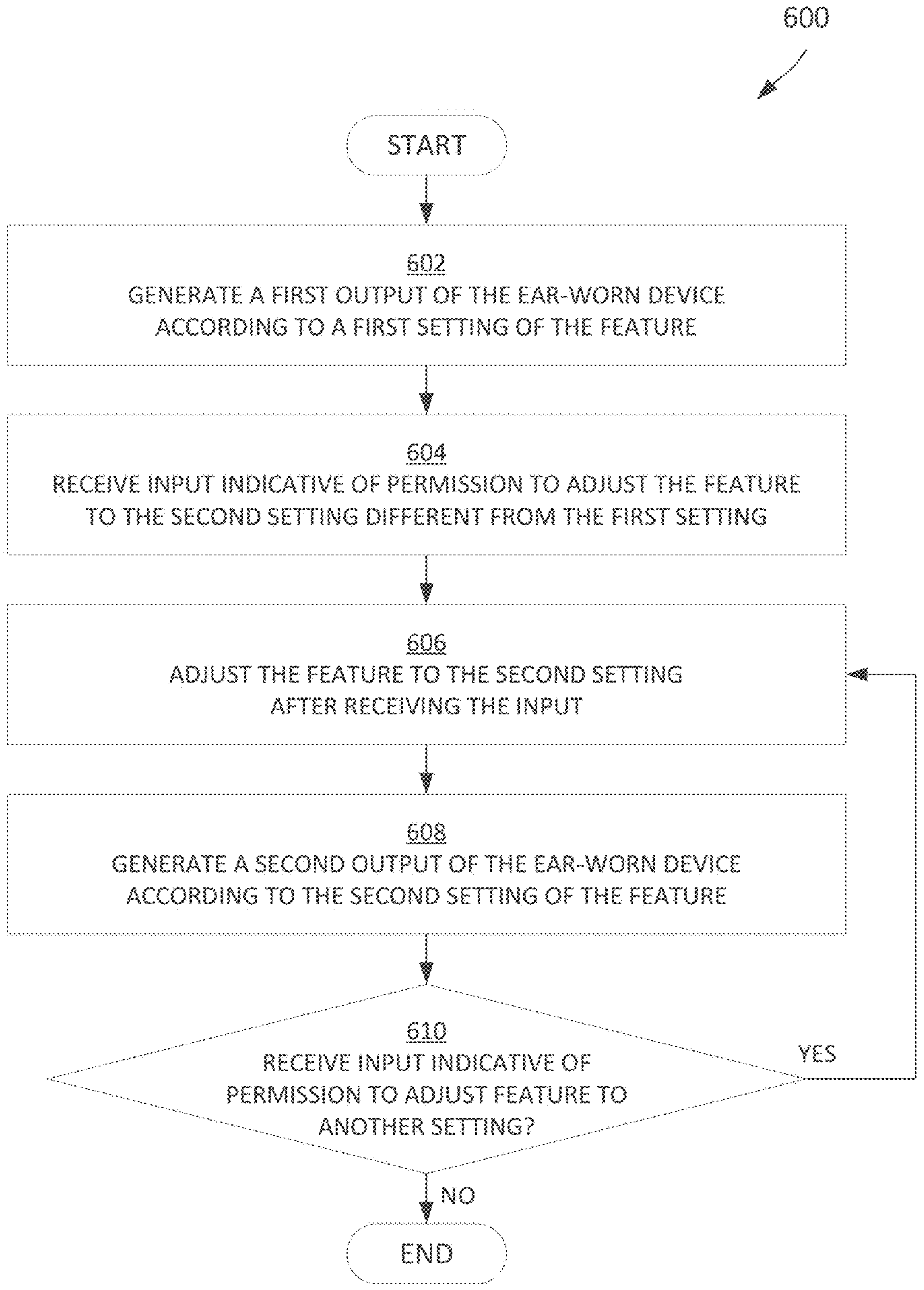
FIG. 6 is a flowchart of an example method of operation of an ear-worn device configured to generate an output according to a plurality of features stored thereon, according to a non-limiting embodiment of the present application.

FIG. 6 is a flowchart of an example method of operation of an ear-worn device configured to generate an output according to a plurality of features stored thereon, according to a non-limiting embodiment of the present application. In some embodiments, method 600 may be implemented by a processor on an ear-worn device such as 108 (in FIG. 1), 202 (in FIG. 2), 300 (in FIG. 3A), and 370 (in FIG. 3B).

At act 602, the processor generates a first output according to a first setting of a feature stored on the ear-worn device. In some embodiments, the feature and the first setting of the feature are stored in connection with one another in memory of the ear-worn device. The feature and the first setting may be used as input to one or more signal processing techniques used to generate the first output. For example, the one or more signal processing techniques may be used to process an input audio signal to generate the first output. The first output may be an audio signal that is output through a speaker of the ear-worn device.

In some embodiments, the processor generates the first output without being prompted by user input. For example, the ear-worn device may store pre-selected features and settings, including the first setting, which are used to generate the first output. If the ear-worn device is an over-the-counter device, the pre-selected features and settings may enable generation of the first output without additional programming by the wearer and/or licensed professional.

Additionally, or alternatively, in some embodiments, the processor generates the first output in response to receiving a command to adjust the feature to the first setting. For example, the command may be received from an electronic device associated with a user (e.g., the ear-worn device wearer, a licensed professional, etc.). In some embodiments, the user may provide user input to the electronic device to request an adjustment of a feature, as described herein including at least with respect to FIG. 5. In response to receiving the user input, the electronic device may transmit the command to the ear-worn device, causing the ear-worn device to adjust the feature to the first setting and subsequently generate the first output according to the first setting.

In some embodiments, the ear-worn device generates output according to the first setting of the feature for any suitable duration of time. For example, the ear-worn device may generate output according to the first setting for a duration of time on the order of minutes, hours, days, weeks, months, or years. In some embodiments, the ear-worn device continues to generate output according to the first setting of the feature until it receives a command to adjust or disable the feature.

At act 604, the processor receives input indicative of permission to adjust the feature to a second setting different from the first setting. The input may be received from an electronic device associated with a user. For example, the input may be received from an electronic device associated with a wearer of the ear-worn device. Additionally, or alternatively, the input may be received from an electronic device associated with a licensed professional. For example, the input may be received in response to a professional fitting of the ear-worn device.

In some embodiments, the processor receives the input after a determination that a wearer of the ear-worn device should obtain a professional fitting. For example, as described herein, an electronic device associated with the wearer may determine, based on the first setting and/or based on user feedback, whether to output a recommendation to obtain a professional fitting. If the electronic device determines to output the recommendation, and if the wearer obtains the professional fitting, the input indicative of the permission may be received in response to and as a result of the professional fitting.

In some embodiments, the input received at act 604 includes a command to adjust the feature to the second setting. For example, during a professional fitting of the ear-worn device, a licensed professional may request adjustment of the feature to the second setting by providing user input to an electronic device. The electronic device may transmit, to the ear-worn device, a command to adjust the feature to the second setting. The command may be transmitted either directly or indirectly. In some embodiments, transmitting the command indirectly includes first transmitting the command to an electronic device associated with a wearer, which relays the command to the ear-worn device.

At act 606, after receiving the input at act 604, the processor adjusts the feature to the second setting. In some embodiments, adjusting the feature to the second setting includes storing (e.g., in memory) the second setting in connection with the feature.

At act 608, the processor generates a second output of the ear-worn device according to the second setting of the feature. In some embodiments, act 608 is performed in the same or in a similar manner to act 602.

At act 610, the processor determines whether input indicative of permission to adjust the feature to another setting has been received. For example, if the wearer of the ear-worn device obtains another professional fitting of the ear-worn device, the ear-worn device may receive further input in response to and as a result of the professional fitting. If, at act 610, the processor determines that input has been received, then the method 600 returns to act 606 where the processor adjusts the feature based on the received input. If, at act 610, the processor determines that input has not been received, then the method 600 ends.

Though not shown, it should be appreciated that method 600 may include one or more additional or alternative acts.

Figure 7B:
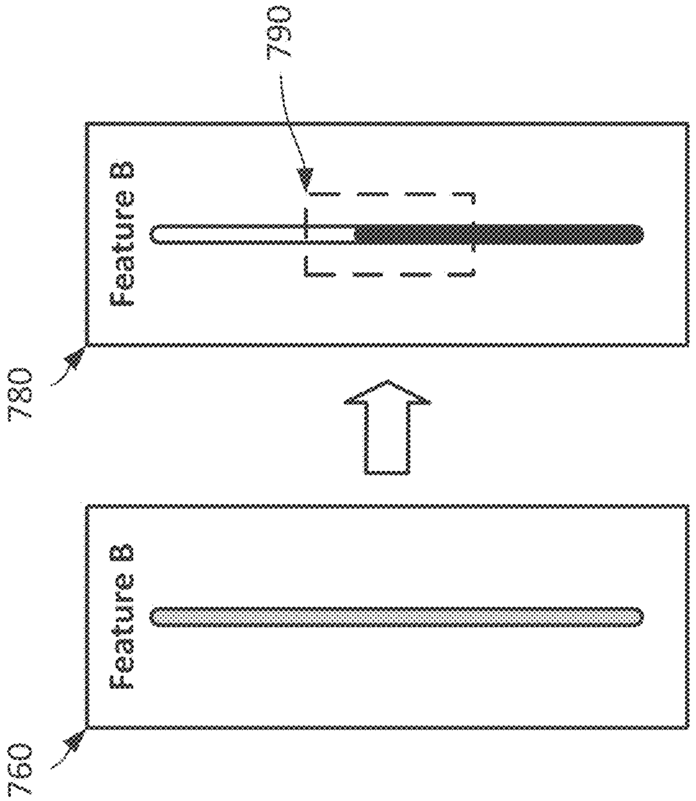
FIG. 7B is a block diagram illustrating features available before and after a professional fitting of the ear-worn device, according to a non-limiting embodiment of the present application.
Figure 7A:
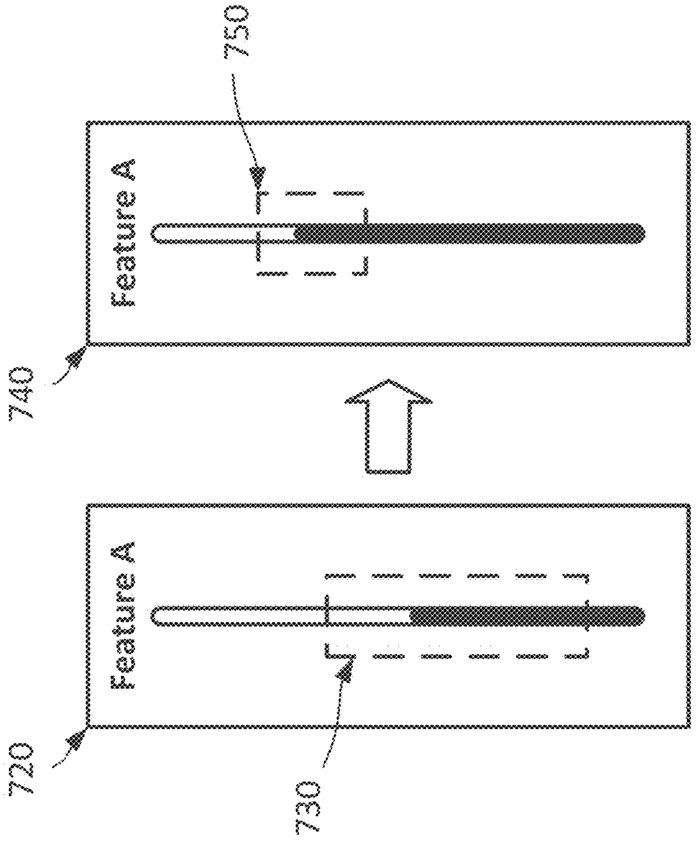
FIG. 7A is a block diagram illustrating settings of a feature available before and after a professional fitting of the ear-worn device, according to a non-limiting embodiment of the present application.

FIGS. 7A-7B are block diagrams illustrating features available to a wearer of the ear-worn device before and after a professional fitting of the ear-worn device. With reference to 720 in FIG. 7A, prior to a professional fitting of the ear-worn device, the wearer can adjust Feature A to any setting within the range 730. With reference to 740, after the professional fitting, the wearer can adjust Feature A within the range 750.

As shown in FIG. 7A, the range of settings 730 available to the wearer prior to the professional fitting may be wider than the range of settings 750 available after the professional fitting. Because the professional fitting identifies one or more settings Feature A that specifically address the wearer's hearing needs, the range 750 may be narrower to prevent the wearer from making drastic adjustments to Feature A relative to the identified settings. However, it should be appreciated that the range 750 may not be narrower than 730, as aspects of the technology are not limited in this respect. Rather, range 730 may be the same width or narrower than range 750.

As also shown in FIG. 7A, the wearer may have access to different settings prior to the professional fitting than after the professional fitting. For example, range 730 defines different maximum and minimum settings than range 750. Accordingly, settings that may be restricted to comply with FDA regulations, for example, may become available to the wearer after the professional fitting. However, it should be appreciated that there may be no change in the range of settings available to the wearer. For example, the professional fitting may be used to identify a particular setting within range 730 that best fits the hearing needs of the wearer. However, the wearer may retain access to the range of settings 730 after the fitting and may still be restricted from adjusting Feature A outside of that range.

As a nonlimiting example, Feature A may refer to the volume of the output of the ear-worn device. With reference to 720, prior to a professional fitting, the wearer may be able to adjust the volume within the range 730. However, the wearer may be restricted from adjusting the volume outside of that range (e.g., to higher volumes). After the professional fitting, with reference to 740, the wearer may be able to adjust the volume within range 750, which includes higher volumes, and may be further restricted from adjusting the volume outside of that range. For example, if the licensed professional decides that volumes within range 750 address the wearer's hearing needs, they may wish to prevent the wearer from adjusting the volume outside of that range, thereby "undoing" the professional fitting.

As shown in FIG. 7B, the wearer may gain access (or lose access) to a feature as a result of a professional fitting. With reference to 760 in FIG. 7B, prior to a professional fitting, the wearer may not be able to use and/or adjust Feature B. However, after the professional fitting and with respect to 780, the wearer may gain access to Feature B and be permitted to adjust Feature B within a range of settings 790. While FIG. 7B shows an example of gaining access to Feature B as a result of the professional fitting, it should be appreciated that the wearer may instead lose access to a feature as a result of the professional fitting, meaning that the wearer may no longer be able to use and/or adjust the feature.

As a nonlimiting example, Feature B may refer to a volume of a particular frequency band. With reference to 760, prior to a professional fitting, the wearer may not be able to adjust the volume of the particular frequency band. However, with reference to 780, a licensed professional (e.g., during a professional fitting) may make that feature available for adjustment by the wearer. Furthermore, the licensed professional may identify a range 790 within which the wearer may adjust the volume of the particular frequency band.

In some embodiments, one or more features may only be accessible to a licensed professional who is performing the professional fitting. Unlike Feature B in FIG. 7B, such features may not become accessible to the wearer, even after the professional fitting. This may prevent the wearer from adjusting and/or selecting features that may result in harmful or distorted output. The licensed professional may be trained to select and/or adjust such features in a way that addresses the hearing needs of the wearer. For example, a licensed professional may be able to adjust the Uncomfortable Loudness Levels, while a wearer may not. As another example, a licensed professional may be able to select and/or adjust attack and release times for compression, while the wearer may not.

As should be appreciated from the foregoing, an ear-worn device may be configured to operate as an over-the-counter device. In such a configuration, a wearer of the ear-worn device may control the output of the ear-worn device by selecting and adjusting features used to generate the output. However, the wearer may be limited to selecting features from among only a subset of the features and to adjusting those features to settings included in a particular range. While the available features and settings may be sufficient to some wearers, they may be insufficient for others. Alternatively, even if the available features and settings are sufficient for a wearer, the wearer may need assistance selecting and adjusting the features to meet their needs.

In cases where the available features and setting are insufficient, or where assistance is needed in selecting and adjusting the features, the wearer may obtain a professional fitting. However, it may not be apparent to a user that they would benefit from a professional fitting. For example, the wearer may not perceive their own hearing deficits or realize that the performance of the ear-worn device could be improved via a professional fitting. Additionally, or alternatively, the wearer may have already obtained a professional fitting, but may not realize that they need an updated fitting.

Accordingly, the inventors have developed techniques for determining whether to output a recommendation to obtain a professional fitting. In some embodiments, the techniques are performed during normal operation of the ear-worn device. For example, the techniques may be performed without initiation by a user (e.g., the wearer). Additionally, or alternatively, the techniques may be performed as a separate test. For example, the user may provide input (e.g., through a user interface of an electronic device) requesting a recommendation for whether he or she should obtain a professional fitting.

According to one such technique, a processor of an electronic device, such as electronic device 204 (in FIG. 2), may determine whether one or more features of the ear-worn device are adjusted to their maximum or minimum available setting, or the frequency with which the user sets the feature to its maximum or minimum available setting. This may indicate that the wearer is trying to adjust the features to settings that are presently unavailable to them, and that the available settings are insufficient to address their hearing needs. If at least a threshold number of the features are set to their maximum or minimum available setting at least a certain percentage of the time, then the processor may determine to output a recommendation to obtain a professional fitting.

Figure 8:
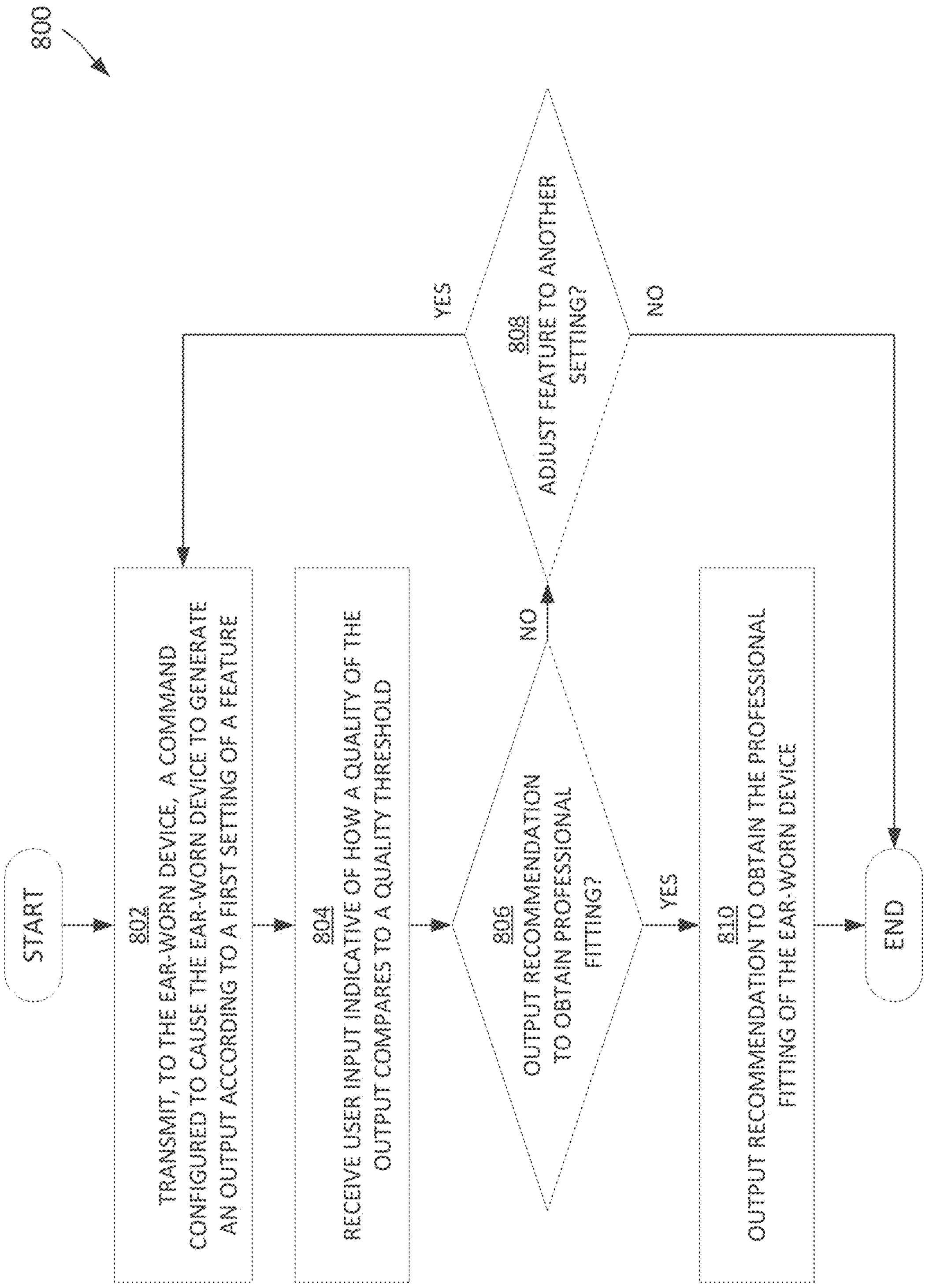
FIG. 8 is a flowchart of an example method of determining whether to recommend a professional fitting, according to a non-limiting embodiment of the present application.

Additionally, or alternatively, in some embodiments, the techniques include determining whether to output a recommendation based on an indication of a quality of an output generated by the ear-worn device. FIG. 8 is a flowchart of an example method of determining whether to recommend a professional fitting based on an indication of a quality of an output of the ear-worn device, according to a non-limiting embodiment of the present application. In some embodiments, method 800 may be implemented by a processor on an electronic device such as 204 in FIG. 2.

At act 802, the processor transmits, to the ear-worn device, a command configured to cause the ear-worn device to generate an output according to a first setting of a particular feature. For example, the command may be configured to cause the ear-worn device to generate a sound and/or speech according to the first setting of the feature. The output sound and/or speech may or may not be representative of sound and/speech in the environment. For example, the processor may determine the sound and/or speech to be output to the user.

In some embodiments, the first setting of the feature is selected by a user of the ear-worn device such as the wearer or a licensed professional. For example, prior to act 802, the user may have adjusted the feature to the first setting. Method 800 may be performed, in part, to determine whether the selected settings are sufficient to address the hearing needs of the wearer.

Additionally, or alternatively, in some embodiments, the first setting of the feature is selected by the processor to test a particular aspect of the wearer's hearing. For example, the processor may select settings that result in maximum (or minimum) permissible output levels of the ear-worn device. If the wearer perceives the quality of the output to be insufficient, this may indicate that the wearer requires different settings that allow for higher (or lower) output levels.

Additionally, or alternatively, the processor may iteratively adjust the first setting to identify if any of the available settings address the wearer's needs. For example, the feature may be background noise and the processor may select a particular level of background noise relative to another level which was already tested during a previous iteration of method 800 or which will be tested during a next iteration of method 800. However, it should be appreciated that the first setting of the feature may be selected in any suitable manner, as aspects of the technology described herein are not limited in this respect.

At act 804, the processor receives input indicative of how a quality of the output compares to a quality threshold. The quality threshold may be any suitable threshold for measuring quality of the output of the ear-worn device, as aspects of the technology are not limited in this respect. For example, in some embodiments, a wearer may indicate that the quality equals or exceeds the quality threshold if they perceive the quality to be sufficient. The wearer may indicate that quality does not equal or exceed the threshold if they perceive the quality to be insufficient. As another example, a wearer may indicate that the quality does not equal or exceed the quality threshold if they do not perceive the output to be too noisy. The wearer may indicate that the quality does exceed the quality threshold if they perceive the output to be too noisy.

In some embodiments, the user input is received through a user interface of an electronic device. For example, the processor may generate a graphical user interface (GUI) which is displayed on the electronic device and with which the wearer may interact to provide input. The wearer may select one or more buttons of the GUI. For example, the wearer may tap one button if they perceived the quality of the output to be above a threshold quality (e.g., sufficient quality) and they may tap a different button if they perceived the quality of the output to be below the threshold quality (e.g., insufficient quality). The GUI may include additional or alternative buttons for the user to provide specific feedback about the output such as whether the output was too loud, too soft, distorted, unintelligible, too noisy, and any other suitable feedback, aspects of the technology are not limited in this respect.

Additionally, or alternatively, the wearer may provide user input using a microphone, keyboard, mouse, or any other suitable user interface of the electronic device. For example, if the generated output represents speech, the wearer may repeat what they heard into a microphone of the electronic device. Additionally, or alternatively, the wearer may type what they heard using a touchscreen or keyboard of the electronic device. To determine the quality of the output, the processor may determine whether the repeated and/or typed words match the words represented in the output signal.

At act 806, the processor determines whether to output a recommendation to obtain a professional fitting. In some embodiments, this is determined based on the input received at act 804. For example, in some embodiments, the processor may determine to output a recommendation if the user input indicates that the quality does not equal or exceed the quality threshold. For example, if the wearer selected a button indicating that the output was of sufficient quality (e.g., equals or exceeds a quality threshold) then the processor may determine not to output the recommendation. By contrast, if the wearer selected a button indicating that the output was of insufficient quality (e.g., does not equal or exceed the quality threshold), then the processor may determine to output the recommendation. In other embodiments, the processor may determine to output a recommendation if the user input indicates that the quality equals or exceeds the quality threshold. For example, if the wearer selects a button indicating that the output was too noisy (e.g., equals or exceeds the quality threshold), then the processor may determine to output the recommendation. By contrast, if the wearer selects a button indicating that the output was not too noisy (e.g., does not equal or exceed the quality threshold), then the processor may determine not to output the recommendation to obtain the professional fitting.

In some embodiments, if the user input includes words repeated into the microphone or typed using a keyboard, then the processor may determine whether the typed or spoken words match those represented in the audio output. If at least a threshold fraction (e.g., at least a third, at least a half, at least three-quarters, etc.) of the typed or spoken words match those represented in the audio output, then the processor may determine that the quality exceeds the quality threshold and determine not to output a recommendation to obtain a professional fitting.

If the processor determines, at act 806, to output a recommendation to obtain the professional fitting, then method 800 proceeds to act 810, where the processor outputs the recommendation. The recommendation may be output using any suitable techniques as aspects of the technology are not limited in this respect. For example, the processor may generate a GUI that is displayed through a user interface (e.g., a display) of an electronic device. In some embodiments, the GUI may also include a functionality that enables the wearer to schedule an appointment and/or conduct a virtual appointment with the licensed professional.

If the processor determines, at act 806, not to output the recommendation, then method 800 proceeds to act 808, where the processor determines whether to adjust the feature to another setting.

In some embodiments, the processor determines whether to adjust the feature to another setting based on the first setting of the feature. For example, if the first setting is already set to the maximum (or minimum) setting available to the wearer without a professional fit, then the processor may determine that there are no other available settings to test. Accordingly, method 800 ends. By contrast, if the first setting can be adjusted to a second setting that is available to the user without a professional fit, and that setting may to improve the quality of the output, then method 800 may return to act 802. At act 802 the processor may transmit to the ear-worn device a command configured to cause the ear-worn device to generate an output according to the second setting.

Additionally, or alternatively, in some embodiments, the processor determines whether to adjust the feature based on user input. For example, the processor may receive input from the wearer of the ear-worn device requesting adjustment of the feature to a second setting. Accordingly, the method may return to act 802 whether the processor transmits the command configured to cause the ear-worn device to generate the output according to the second setting. By contrast, if the processor does not receive further input requesting adjustment of the feature, then method 800 ends.

Though not shown, it should be appreciated that method 800 may include one or more additional or alternative acts.

Figure 9:
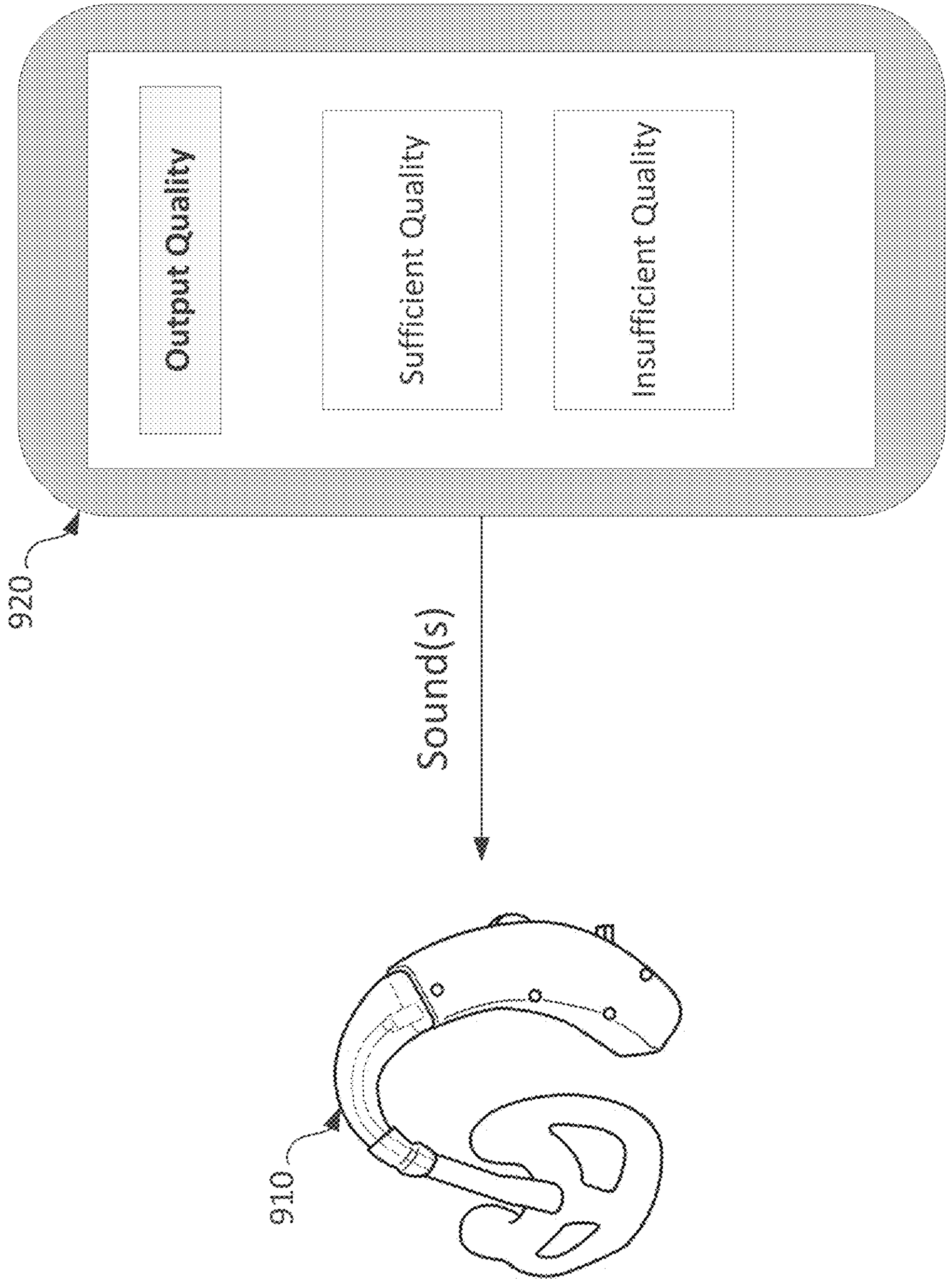
FIG. 9 illustrates communication between an ear-worn device and a separate electronic device for determining whether to recommend a professional fitting, according to a non-limiting embodiment of the present application.

FIG. 9 illustrates example communication between an ear-worn device 910 and a separate electronic device 920 for determining whether to recommend a professional fitting, according to a non-limiting embodiment of the present application. In some embodiments, the ear-worn device 910 is an example of device 108 (in FIG. 1), device 202 (in FIG. 2), device 300 (in FIG. 3A), and/or device 370 (in FIG. 3B). In some embodiments, the electronic device 920 is example of device 204 (in FIG. 2).

As shown in FIG. 9, the electronic device 920 may transmit a command to the ear-worn device. The command may be indicative of sound(s) to be represented by an audio output signal. For example, the sound(s) may include speech including one or more words.

Upon receiving the command, the ear-worn device 910 may generate an output signal representing the sound(s) indicated by the command. In some embodiments, the output signal is generated according to one or more features at their respective settings. For example, the output signal may be generated according to features and settings that are pre-sets of the ear-worn device, features and settings that were selected and adjusted by the wearer, and/or features and settings that were selected and adjusted by a licensed professional. The audio output signal may be output through a speaker of the ear-worn device. A wearer of the ear-worn device may hear the sound(s) represented by the output signal and, in response, provide user input through a user interface of the electronic device 920.

The user input may be indicative of the quality of the output, as perceived by the wearer. As shown in the example, the wearer may select a button indicating that the quality was sufficient to the wearer or a button indicating that the quality was insufficient to the wearer. However, as described herein, it should be appreciated that the wearer may provide input using any suitable user input techniques and/or interfaces, as embodiments of the technology are not limited in this respect.

As described herein, including at least with respect to FIG. 8, the electronic device 920 may be configured to determine, based on the user input, whether to output a recommendation that the wearer consult a licensed professional to obtain a professional fitting.

FIGS. 10A-10D illustrate examples of graphical user interface that may be implemented in an electronic device, according to some non-limiting embodiments of the present application. As shown in FIGS. 10A-10D, the electronic device may be a smartphone. However, it should be appreciated that the electronic device may be any suitable electronic device as aspects of the technology are not limited in this respect.

Figure 10B:
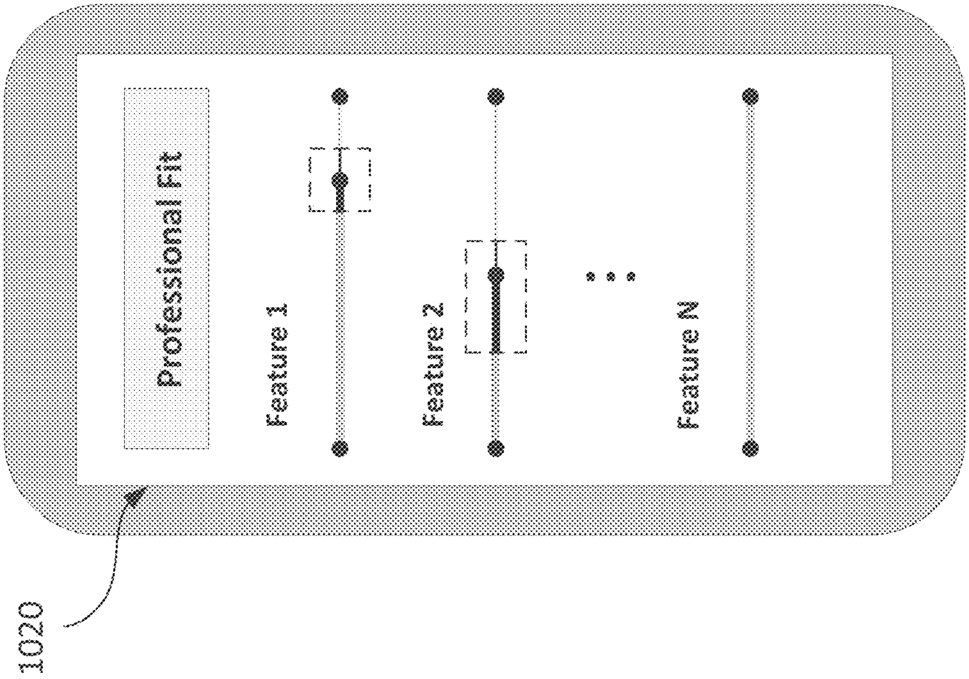
FIG. 10B illustrates an example graphical user interface that may be implemented in an electronic device to adjust the settings of one or more features after a professional fitting of an ear-worn device, according to a non-limiting embodiment of the present application.
Figure 10A:
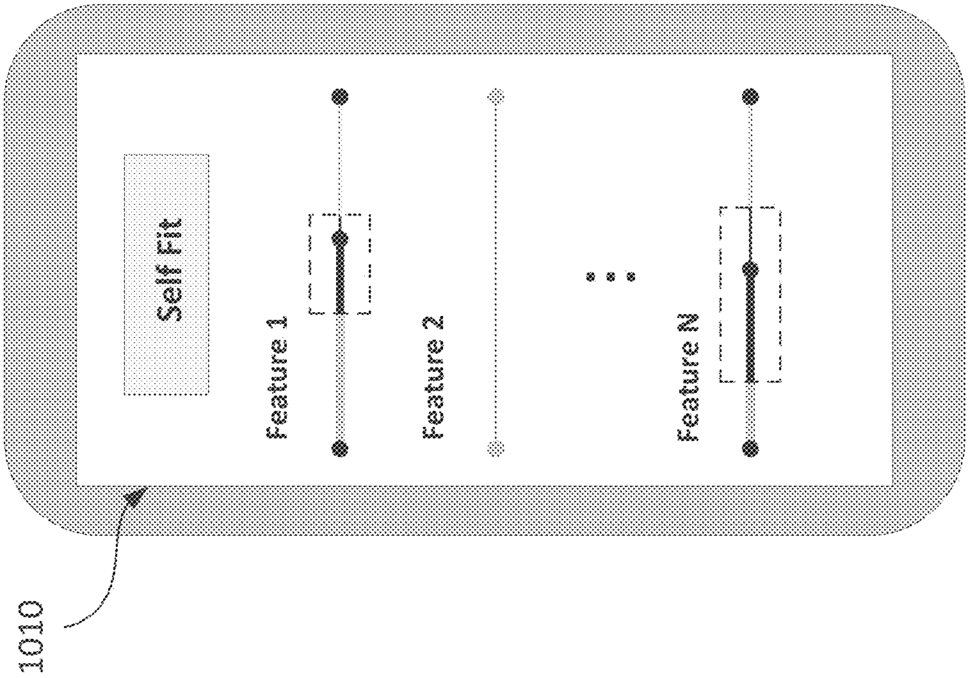
FIG. 10A illustrates an example graphical user interface that may be implemented in an electronic device to adjust the settings of one or more features prior to a professional fitting of an ear-worn device, according to a non-limiting embodiment of the present application.

With reference to FIG. 10A, an example display 1010 may be implemented in a user interface of an electronic device, such as electronic device 204 in FIG. 2. For example, the display 1010 can be displayed on the display screen of the device, such as display screen 102 in FIG. 1, for example. The example display 1010 includes a list of features and settings stored on the ear-worn device. In the example of FIG. 10A, the list of features and settings may represent the list of features and settings available to a user prior to a professional fitting, in a self-fit mode of operation.

A user may interact with the example display 1010 to select and/or adjust a feature. For example, the user may adjust Feature 1 and Feature N within their available ranges of settings. However, the user may be restricted from selecting and/or adjusting Feature 2.

With reference to FIG. 10B, an example display 1020 may be implemented in a user interface of an electronic device, such as electronic device 204 in FIG. 2. The example display 1020 also includes a list of features and setting stored on the ear-worn device. In the example of FIG. 10B, the list of features and settings may represent the list of features and settings available to a user following a professional fitting. As shown, different features and settings may be available to the user than those in shown in the example display 1020.

A user may interact with the example display 1020 to select and/or adjust a feature. For example, the user may adjust Feature 1 and Feature 2 within their available range of settings. However, the user may be restricted from selecting and/or adjusting Feature N.

It should be appreciated that the displays 1010 and 1020 are meant only as examples, and that a display may be configured in any manner suitable for allowing selection and adjustment of features stored on the ear-worn device, as aspects of the technology are not limited in this respect.

Figure 10D:
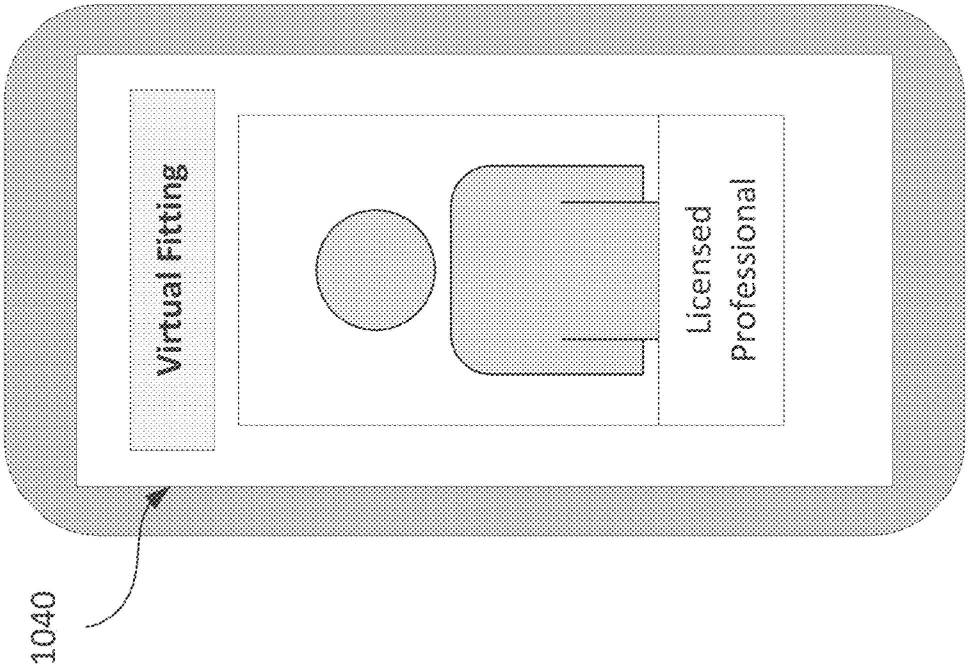
FIG. 10D illustrates an example graphical user interface that may be implemented in an electronic device to conduct a virtual fitting of an ear-worn device, according to a non-limiting embodiment of the present application.
Figure 10C:
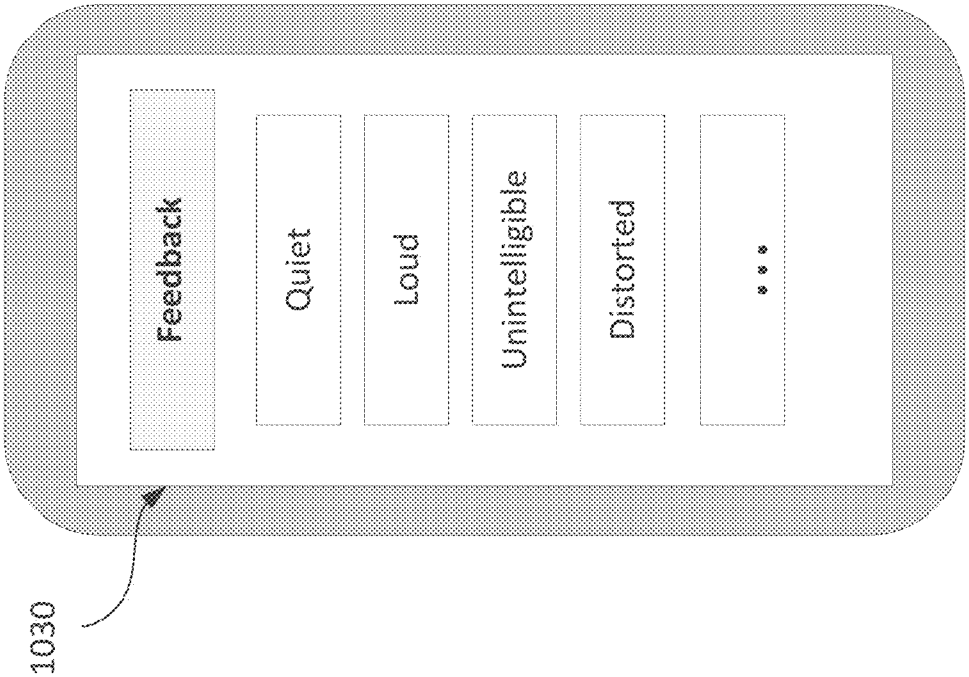
FIG. 10C illustrates an example graphical user interface that may be implemented in an electronic device to provide user feedback relating to the output of the ear-worn device, according to a non-limiting embodiment of the present application.

With reference to FIG. 10C, an example display 1030 may be implemented in a user interface of an electronic device, such as electronic device 204 in FIG. 2. The example display 1030 includes a list of options for providing user feedback relating to the quality of sound output by the ear-worn device. For example, the user may provide feedback indicating that the output is too quiet, too loud, unintelligible, distorted, or any other suitable feedback, as aspects of the technology are not limited in this respect.

The user may select one or more of the listed options. The selected options may be used to determine whether to recommend that the user consult a licensed professional to obtain a professional fitting. Additionally, or alternatively, the selected options may be used to improve other aspects of the ear-worn device. For example, the feedback may be used to update a machine learning model on the ear-worn device.

It should be appreciated that display 1030 is meant only as an example, and that a display may be configured in any manner suitable for allowing provision of user feedback, as aspects of the technology are not limited in this respect.

With reference to FIG. 10D, an example display 1040 may be implemented in a user interface of an electronic device, such as electronic device 204 in FIG. 2. The example display 1040 is configured to support a virtual meeting, such as a telehealth appointment with a licensed professional. For example, the ear-worn device may be professionally fit to the wearer as part of the telehealth appointment. Additionally, or alternatively, though not shown, the display may be configured to allow the wearer to schedule an in-person or virtual appointment with a licensed professional.

Figure 11:
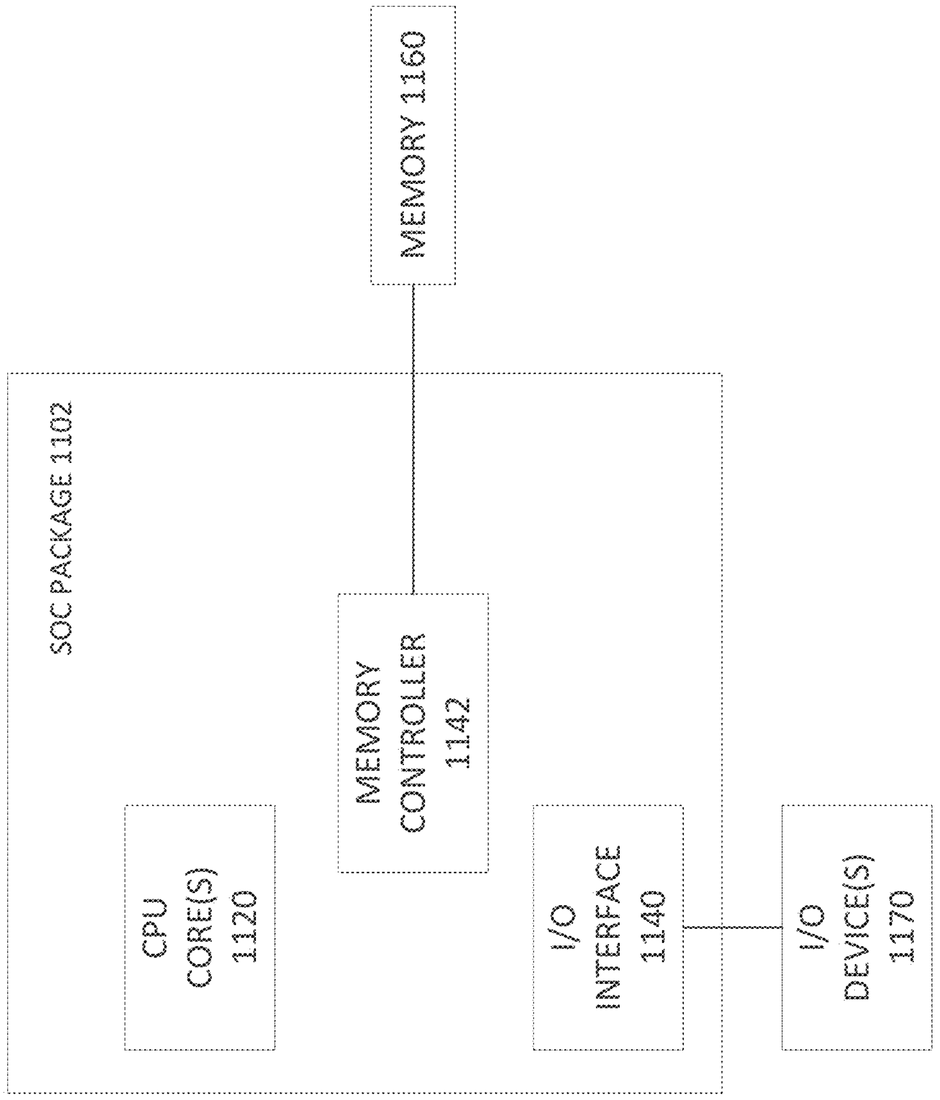
FIG. 11 illustrates a block diagram of a system-on-chip (SOC) package that may be implemented in an ear-worn device, according to a non-limiting embodiment of the present application.

FIG. 11 illustrates a block diagram of a system-on-chip (SOC) package that may be implemented in an ear-worn device, according to a non-limiting embodiment of the present application. In some embodiments, SOC package 1102 may implement various operations in an ear-worn device, such as 108 (in FIG. 1), 202 (in FIG. 2), 300 (in FIG. 3A), 370 (in FIG. 3B), or a circuitry of an ear-worn device such as 400 (in FIG. 4). In various embodiments, SOC 1102 includes one or more Central Processing Unit (CPU) cores 1120, an Input/Output (I/O) interface 1140, and a memory controller 1142. Various components of the SOC package 1102 may be optionally coupled to an interconnect or bus such as discussed herein with reference to the other figures. Also, the SOC package 1102 may include components such as those discussed with reference to the ear-worn device described in FIGS. 1-10D. Further, each component of the SOC package 1120 may include one or more other components of the ear-worn device, e.g., as discussed with reference to FIGS. 3A-4. In one embodiment, SOC package 1102 (and its components) is provided on one or more Integrated Circuit (IC) die, e.g., which are packaged into a single semiconductor device. The single semiconductor device may be configured to be used as an ear-worn device, an amplification system or a hearing device to be used in the human ear canal.

As illustrated in FIG. 11, SOC package 1102 is coupled to a memory 1160 via the memory controller 1142. In an embodiment, the memory 1160 (or a portion of it) can be integrated on the SOC package 1102. The I/O interface 1140 may be coupled to one or more I/O devices 1170, e.g., via an interconnect and/or bus such as discussed herein. I/O device(s) 1170 may include interfaces to communicate with SOC 1102. In an exemplary embodiment, I/O interface 1140 communicates wirelessly with I/O device 1170. SOC package 1102 may comprise hardware, software and logic to implement, for example, the various components or methods described in FIGS. 1-10D. The implementation may be communicated with an auxiliary device, e.g., I/O device 1170. I/O device 1170 may comprise additional communication capabilities, e.g., cellular, BlueTooth, WiFi or other protocols, to access any component in the ear-worn device.

Figure 12:
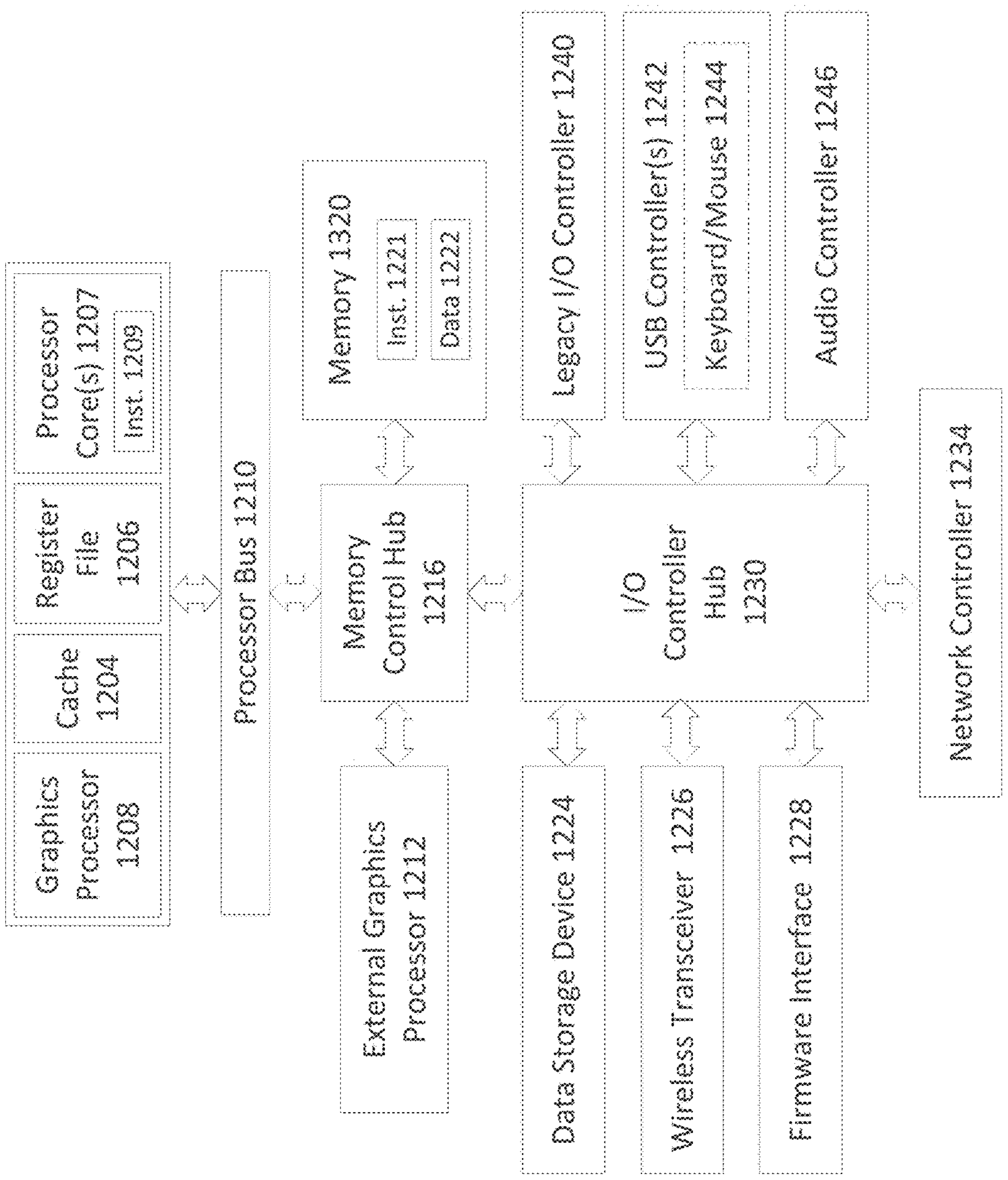
FIG. 12 illustrates an example of a computing system that may be implemented in an electronic device to implement various embodiments described in the present application.

FIG. 12 illustrates an example of a computing system that may be implemented in an electronic device to implement various embodiments described in the present application. In some embodiments, system 1200 may implement operations described in various embodiments with reference to FIGS. 1-2 and 5-10D on an electronic device, such as 110 (in FIG. 1) or 204 (in FIG. 2). In some embodiments, the system 1200 includes one or more processors 1202 and one or more graphics processors 1208, and may be a single processor desktop system, a multiprocessor workstation system, or a server system having a large number of processors 1202 or processor cores 1207. In on embodiment, the system 1200 is a processing platform incorporated within a system-on-a-chip (SoC or SOC) integrated circuit for use in mobile, handheld, or embedded devices.

An embodiment of system 1200 can include or be incorporated within a server-based smart-device platform or an online server with access to the internet. In some embodiments system 1200 is a mobile phone, smart phone, tablet computing device or mobile Internet device. Data processing system 1200 can also include, couple with, or be integrated within a wearable device, such as a smart watch wearable device, smart eyewear device (e.g., face-worn glasses), augmented reality device, or virtual reality device. In some embodiments, data processing system 1200 is a television or set top box device having one or more processors 1202 and a graphical interface generated by one or more graphics processors 1208.

In some embodiments, the one or more processors 1202 each include one or more processor cores 1207 to process instructions which, when executed, perform operations for system and user software. In some embodiments, each of the one or more processor cores 1207 is configured to process a specific instruction set 1209. In some embodiments, instruction set 1209 may facilitate Complex Instruction Set Computing (CISC), Reduced Instruction Set Computing (RISC), or computing via a Very Long Instruction Word (VLIW). Multiple processor cores 1207 may each process a different instruction set 1209, which may include instructions to facilitate the emulation of other instruction sets. Processor core 1207 may also include other processing devices, such as a DSP.

In some embodiments, the processor 1202 includes cache memory 1204. Depending on the architecture, the processor 1202 can have a single internal cache or multiple levels of internal cache. In some embodiments, the cache memory is shared among various components of the processor 1202. In some embodiments, the processor 1202 also uses an external cache (e.g., a Level-3 (L3) cache or Last Level Cache (LLC)) (not shown), which may be shared among processor cores 1207 using known cache coherency techniques. A register file 1206 is additionally included in processor 1202 which may include different types of registers for storing different types of data (e.g., integer registers, floating point registers, status registers, and an instruction pointer register). Some registers may be general-purpose registers, while other registers may be specific to the design of the processor 1202.

In some embodiments, processor 1202 is coupled to a processor bus 1210 to transmit communication signals such as address, data, or control signals between processor 1202 and other components in system 1200. In one embodiment the system 1200 uses an exemplary 'hub' system architecture, including a memory controller hub 1216 and an Input Output (I/O) controller hub 1230. A memory controller hub 1216 facilitates communication between a memory device and other components of system 1200, while an I/O Controller Hub (ICH) 1230 provides connections to I/O devices via a local I/O bus. In one embodiment, the logic of the memory controller hub 1216 is integrated within the processor.

Memory device 1220 can be a dynamic random-access memory (DRAM) device, a static random access memory (SRAM) device, flash memory device, phase-change memory device, or some other memory device having suitable performance to serve as process memory. In one embodiment the memory device 1220 can operate as system memory for the system 1200, to store data 1222 and instructions 1221 for use when the one or more processors 1202 executes an application or process. Memory controller hub 1216 also couples with an optional external graphics processor 1212, which may communicate with the one or more graphics processors 1208 in processors 1202 to perform graphics and media operations.

In some embodiments, ICH 1230 enables peripherals to connect to memory device 1220 and processor 1202 via a high-speed I/O bus. The I/O peripherals include, but are not limited to, an audio controller 1246, a firmware interface 1228, a wireless transceiver 1226 (e.g., Wi-Fi, Bluetooth), a data storage device 1224 (e.g., hard disk drive, flash memory, etc.), and a legacy I/O controller 1240 for coupling legacy (e.g., Personal System 2 (PS/2)) devices to the system. One or more Universal Serial Bus (USB) controllers 1242 connect input devices, such as keyboard and mouse 1244 combinations. A network controller 1234 may also couple to ICH 1230. In some embodiments, a high-performance network controller (not shown) couples to processor bus 1210. It will be appreciated that the system 1200 shown is exemplary and not limiting, as other types of data processing systems that are differently configured may also be used. For example, the I/O controller hub 1230 may be integrated within the one or more processor 1202, or the memory controller hub 1216 and I/O controller hub 1230 may be integrated into a discreet external graphics processor, such as the external graphics processor 1212.

According to some embodiments, a method of generating an output of an ear-worn device is provided. In some embodiments, the ear-worn device has a plurality of features stored thereon. The plurality of features includes a first feature used to generate the output of the ear-worn device. The method comprises: using at least one processor to perform: generating a first output of the ear-worn device according to a first setting of the first feature, wherein the first setting is included in a first range of settings; after generating the first output of the ear-worn device, receiving input indicative of permission to adjust the first feature to a second setting different from the first setting and included in a second range of settings different from the first range of settings; adjusting the first feature to the second setting only after receiving the input; and generating a second output of the ear-worn device according to the second setting of the first feature.

It should be appreciated that according to an aspect of the present disclosure, the device software component of the ear-worn device (e.g., hearing aid) may provide means of adjustment only available to licensed professionals (or those working under the direction of licensed professionals). The adjustment means may be deployed remotely. For example, in one application, the user may engage her mobile device to request a higher performance amplitude (hearing aid volume) or frequency range. The request may then be transmitted the cloud to a practitioner through the applet and or software available to both the user and the practitioner. The practitioner may then authorize such increase remotely. In one embodiment, the system may match the user to existing records and provide the practitioner with the patient's background and health information. The system may also identify the user as a new patient and intervene to arrange a physical examination of the user's hearing capacity prior to authorizing the requested changes.

It should be appreciated that according to an aspect of the present disclosure, the software may allow the professional to enter prescription information to authorize medical necessity and thereby unlock the hearing aid device's full range (or a more comprehensive range) of available features of the hardware and software. Thus, in one exemplary implementation, the professional is able to adjust the device to meet the patient's needs. After the fitting, it is likely that the range of adjustable features available to the user would be much wider; for example, before the so-called unlock, the maximum volume might be 115 dB SPL, but afterwards it may be increased to 130 dB SPL, with the limit set by the clinician.

It should be appreciated that according to an aspect of the present disclosure, a machine learning (ML) and artificial intelligence (AI) may be used to assist the clinician in certain decision-making aspects. In one embodiment, the ML may obtain data from similarly situated users to determine optimal user experience given one or more environmental factors. The AI may use this information to recommend changes to the clinician or to automatically implemented the changes on the hearing aid without the clinician's intervention.

It should be appreciated that according to an aspect of the present disclosure, the features that might be limited to a clinician unlock may be expansive to parameters that can be controlled via software on the device. Consistent with the regulatory requirements, in certain embodiments, features such as device output, the choppiness of the fitting curve (the differences between gain applied at different frequencies might be higher when unlocked), and the frequency response may be subject to the clinician's remote unlocking purview.

It should be appreciated that according to an aspect of the present disclosure, the software component may include telemedicine software to facilitate the interaction between the clinician and the patient such that the clinician (likely an audiologist) can assess the patient's records and needs. This may comprise the capability to administer a remote hearing test and/or examination. The remote examination may allow the clinician to interact with the patient in real-time using an audio/video (AV) device and the hearing aid device. In this manner, the clinician may remotely examine and diagnose the patient's hearing limits by engaging the hearing aid device remotely and by receiving data from the hearing aid and the patient.

It should be appreciated that according to an aspect of the present disclosure, if determined medically necessary, the clinician may then unlock additional features of the hearing aid device to improve the patient's hearing capacity. Alternatively, the clinician may direct the patient to schedule additional in-person testing and examination. The system may create a record of the remote examination and the clinician's recommendations for further actions, including any follow-up schedule.

Aspects of disclosed embodiments apply both to air-conducting hearing aids that are wirelessly programmable and devices that are self-fitting. In the scenario where the device is self-fitting, it is notable that the user's ability to fit the hearing aid to the user's needs is not the equivalent to unlocking the device's restricted features. The user may be able to tune frequency response curve or change the output limits according to the user's own needs, but if they want to go outside of the ranges allowed out of the box, they would need a prescription.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

What is claimed is:

1. A system, comprising:

an ear-worn hearing aid device configured to:

prevent a wearer of the ear-worn hearing aid device from adjusting a gain for a particular frequency band of sound output from the ear-worn hearing aid device outside an over-the-counter (OTC) range of gains for the particular frequency band, the OTC range of gains for the particular frequency band having a OTC maximum gain value for the particular frequency band, wherein:

the OTC range of gains for the particular frequency band is pre-selected when the wearer obtains the ear-worn hearing aid device as an OTC ear-worn hearing aid device; and the OTC maximum gain value for the particular frequency band is less than a maximum gain for the particular frequency band at which the ear-worn hearing aid device is capable of operating;

receive, following a professional fitting by a licensed professional, input to unlock a prescription range of gains for the particular frequency band, the prescription range of gains for the particular frequency band having a prescription maximum gain value for the particular frequency band that is greater than the OTC maximum gain value for the particular frequency band; and based on receiving the input to unlock the prescription range of gains for the particular frequency band:

enable the wearer of the ear-worn hearing aid device to adjust the gain for the particular frequency band of the sound output from the ear-worn hearing aid device above the OTC maximum gain value for the particular frequency band, but prevent the wearer of the ear-worn hearing aid device from adjusting the gain for the particular frequency band of the sound output from the ear-worn hearing aid device outside the prescription range of gains for the particular frequency band.

2. The system of claim 1, wherein the prescription range of gains for the particular frequency band is narrower than the OTC range of gains for the particular frequency band.

3. The system of claim 1, wherein:

an OTC minimum gain value for the particular frequency band is a minimum of the OTC range of gains for the particular frequency band, and prior to receiving the input, the ear-worn hearing aid device is configured to prevent the wearer from adjusting the gain for the particular frequency band below the OTC minimum gain value for the particular frequency band;

a prescription minimum gain value for the particular frequency band is a minimum of the prescription range of gains for the particular frequency band, and based on receiving the input, the ear-worn hearing aid device is configured to prevent the wearer from adjusting the gain for the particular frequency band below the prescription minimum gain value for the particular frequency band; and the OTC minimum gain value for the particular frequency band and the prescription minimum gain value for the particular frequency band are different.

4. The system of claim 3, wherein the prescription minimum gain value for the particular frequency band is higher than the OTC minimum gain value for the particular frequency band.

5. The system of claim 1, wherein enabling the wearer of the ear-worn hearing aid device to adjust the gain for the particular frequency band of the sound output from the ear-worn hearing aid device above the OTC maximum gain value for the particular frequency band, but preventing the wearer of the ear-worn hearing aid device from adjusting the gain for the particular frequency band of the sound output from the ear-worn hearing aid device outside the prescription range of gains for the particular frequency band, comprises updating firmware of the ear-worn hearing aid device.

6. The system of claim 5, wherein:

the system further comprises an electronic device; and updating the firmware comprises receiving a new firmware image from the electronic device.

7. The system of claim 1, wherein the gain for the particular frequency band of the sound output is configured at a value less than the OTC maximum gain value for the particular frequency band when the wearer obtains the ear-worn hearing aid device as the OTC ear-worn hearing aid device.

8. The system of claim 1, wherein the ear-worn hearing aid device is configured to prevent the wearer of the ear-worn hearing aid device from adjusting the gain for the particular frequency band of the sound output from the ear-worn hearing aid device outside the OTC range of gains for the particular frequency band without additional programming by the wearer and/or the licensed professional.

9. The system of claim 1, further comprising a user mobile device configured to:

receive from the wearer a request for a higher gain for the particular frequency band; and transmit the request to the licensed professional.

10. The system of claim 9, further comprising:

an electronic device of the licensed professional configured to:

receive the request from the user mobile device;

receive, from the licensed professional, prescription information authorizing medical necessity; and transmit the input to the user mobile device, wherein the user mobile device is configured to transmit the input to the ear-worn hearing aid device.

11. The system of claim 9, further comprising:

an electronic device of the licensed professional configured to:

receive the request from the user mobile device;

receive, from the licensed professional, prescription information authorizing medical necessity; and transmit the input to the ear-worn hearing aid device.

12. The system of claim 1, wherein the OTC maximum gain value for the particular frequency band is within regulations for the OTC ear-worn hearing aid device and the prescription maximum gain value for the particular frequency band is not within the regulations for the OTC ear-worn hearing aid device.

13. The system of claim 1, wherein the ear-worn hearing aid device is capable of operating at the prescription maximum gain value for the particular frequency band when obtained as the OTC ear-worn hearing aid device.

14. The system of claim 1, wherein the ear-worn hearing aid device is configured to operate both as the OTC ear-worn hearing aid device and as a prescription ear-worn hearing aid device.

15. The system of claim 1, wherein the system is further configured to recommend a professional fitting to the wearer based on the wearer adjusting a gain for the particular frequency band for the ear-worn hearing aid device to the OTC maximum gain value for the particular frequency band.

16. The system of claim 1, wherein the ear-worn hearing aid device is configured to prevent the wearer of the ear-worn hearing aid device from adjusting an uncomfortable loudness level.

17. The system of claim 1, wherein the ear-worn hearing aid device is configured to prevent the wearer of the ear-worn hearing aid device from adjusting attack and release times for compression.

18. A method, comprising:

performing, by a licensed professional, a professional fitting of an ear-worn hearing aid device for a wearer of the ear-worn hearing aid device, wherein:

the wearer obtained the ear-worn hearing aid device as an over-the-counter (OTC) device, and upon the wearer obtaining the ear-worn hearing aid device, the ear-worn hearing aid device was configured to prevent the wearer from adjusting a gain for a particular frequency band of sound output from the ear-worn hearing aid device outside a pre-selected OTC range of gains for the particular frequency band, the OTC range of gains for the particular frequency band having an OTC maximum gain value for the particular frequency band, wherein the OTC maximum gain value for the particular frequency band is less than a maximum gain for the particular frequency band at which the ear-worn hearing aid device is capable of operating;

transmitting to the ear-worn hearing aid device, by the licensed professional and following the professional fitting by a licensed professional, input to unlock a prescription range of gains for the particular frequency band, the prescription range of gains for the particular frequency band having a prescription maximum gain value for the particular frequency band, wherein:

the prescription maximum gain value for the particular frequency band is greater than the OTC maximum gain value for the particular frequency band; and based on receiving the input to unlock the prescription range of gains for the particular frequency band, the ear-worn hearing aid device is configured to enable the wearer of the ear-worn hearing aid device to adjust the gain for the particular frequency band of the sound output from the ear-worn hearing aid device above the OTC maximum gain value for the particular frequency band, but to prevent the wearer of the ear-worn hearing aid device from adjusting the gain for the particular frequency band of the sound output from the ear-worn hearing aid device outside the prescription range of gains for the particular frequency band.

19. The method of claim 18, wherein the prescription range of gains for the particular frequency band is narrower than the OTC range of gains for the particular frequency band.

20. The method of claim 18, wherein:

an OTC minimum gain value for the particular frequency band is a minimum of the OTC range of gains for the particular frequency band, and prior to receiving the input, the ear-worn hearing aid device is configured to prevent the wearer from adjusting the gain for the particular frequency band below the OTC minimum gain value for the particular frequency band;

a prescription minimum gain value for the particular frequency band is a minimum of the prescription range of gains for the particular frequency band, and based on receiving the input, the ear-worn hearing aid device is configured to prevent the wearer from adjusting the gain for the particular frequency band below the prescription minimum gain value for the particular frequency band; and the OTC minimum gain value for the particular frequency band and the prescription minimum gain value for the particular frequency band are different.

* * * * *